United States Patent
Yamaguchi et al.

(10) Patent No.: US 11,118,041 B2
(45) Date of Patent: Sep. 14, 2021

(54) THERMOPLASTIC ELASTOMER COMPOSITIONS COMPRISING ULTRAHIGH MOLECULAR WEIGHT POLYETHYLENE AND METHODS FOR MAKING THE SAME

(71) Applicant: ExxonMobil Chemical Patents Inc., Baytown, TX (US)

(72) Inventors: Toshiaki Yamaguchi, Kanagawa (JP); Oscar O. Chung, Houston, TX (US); Eric P. Jourdain, Rhode Saint Genese (BE)

(73) Assignee: ExxonMobil Chemical Patents Inc., Baytown, TX (US)

(*) Notice: Subject to any disclaimer, the term of this patent is extended or adjusted under 35 U.S.C. 154(b) by 403 days.

(21) Appl. No.: 15/569,193

(22) PCT Filed: May 13, 2016

(86) PCT No.: PCT/US2016/032433
§ 371 (c)(1),
(2) Date: Oct. 25, 2017

(87) PCT Pub. No.: WO2016/204897
PCT Pub. Date: Dec. 22, 2016

(65) Prior Publication Data
US 2018/0100061 A1    Apr. 12, 2018

Related U.S. Application Data

(60) Provisional application No. 62/182,136, filed on Jun. 19, 2015.

(30) Foreign Application Priority Data
Aug. 20, 2015  (EP) .................................... 15181733

(51) Int. Cl.
*B32B 27/08*    (2006.01)
*C08L 23/12*    (2006.01)
(Continued)

(52) U.S. Cl.
CPC .............. *C08L 23/12* (2013.01); *B32B 27/08* (2013.01); *B32B 27/32* (2013.01); *C08L 23/10* (2013.01);
(Continued)

(58) Field of Classification Search
CPC .......... C08F 10/00; C08F 10/02; C08F 10/06; C08F 110/00; C08F 110/02; C08F 110/06;
(Continued)

(56) References Cited

U.S. PATENT DOCUMENTS

| 5,110,685 A | 5/1992 | Cross et al. |
| 5,343,655 A | 9/1994 | Miyakawa et al. |

(Continued)

FOREIGN PATENT DOCUMENTS

| JP | 2909799 B | 6/1999 |
| JP | 2000-025098 A | 1/2000 |

(Continued)

OTHER PUBLICATIONS

Mi-Zex Million Datasheet, Mitsui Chemical, accessed Jan. 16, 2020 from https://jp.mitsuichemicals.com/sites/default/files/media/document/2018/hi-zex-million_e.pdf (Year: 2020).*

*Primary Examiner* — Zachary M Davis

(57) ABSTRACT

Described herein are thermoplastic elastomer compositions that comprise 30-60 wt % of a thermoplastic vulcanizate, 5 to 25 wt % of a thermoplastic resin, 5 to 25 wt % of a high density polyethylene, and 5 to 40 wt % of a ultrahigh molecular weight polyethylene. The thermoplastic elastomer (Continued)

compositions may be particularly useful in forming laminates, such as slip coat laminates for glass run channels.

14 Claims, 18 Drawing Sheets

(51) Int. Cl.
 *C08L 23/10* (2006.01)
 *B32B 27/32* (2006.01)
(52) U.S. Cl.
 CPC ... *B32B 2307/538* (2013.01); *B32B 2323/043* (2013.01); *C08L 2205/035* (2013.01); *C08L 2207/04* (2013.01); *C08L 2207/062* (2013.01); *C08L 2207/068* (2013.01)
(58) Field of Classification Search
 CPC .... C08F 210/00; C08F 210/02; C08F 210/06; C08L 23/025; C08L 23/04; C08L 23/06; C08L 23/08; C08L 23/0807; C08L 23/0815; C08L 23/10; C08L 23/12; C08L 23/14
 See application file for complete search history.

(56) References Cited

U.S. PATENT DOCUMENTS

| | | | |
|---|---|---|---|
| 5,378,543 A | 1/1995 | Murata et al. | |
| 5,424,019 A | 6/1995 | Miyakawa et al. | |
| 5,441,685 A | 8/1995 | Miyakawa et al. | |
| 5,447,671 A | 9/1995 | Kato et al. | |
| 6,115,967 A | 9/2000 | Warnecke | |
| 6,146,739 A | 11/2000 | Itoh et al. | |
| 6,368,700 B1 | 4/2002 | Venkataswamy et al. | |
| 6,497,960 B1 | 12/2002 | Kobayashi et al. | |
| 6,499,256 B1 | 12/2002 | Aritake et al. | |
| 6,534,147 B2 | 3/2003 | Gopalan | |
| 6,660,360 B2 | 12/2003 | Mertcel et al. | |
| 6,706,385 B1 | 3/2004 | Karaiwa | |
| 6,866,939 B1 | 3/2005 | Karaiwa | |
| 7,579,408 B2 | 8/2009 | Walton et al. | |
| 8,334,344 B2 | 12/2012 | Honda et al. | |
| 2002/0151653 A1 | 10/2002 | Jeong et al. | |
| 2002/0185824 A1* | 12/2002 | Sakane | F16J 15/025 277/628 |
| 2004/0006170 A1 | 1/2004 | Haftka et al. | |
| 2017/0044331 A1* | 2/2017 | Hirose | C08J 3/24 |
| 2019/0309115 A1 | 10/2019 | Datta et al. | |

FOREIGN PATENT DOCUMENTS

| | | |
|---|---|---|
| JP | 2000-026668 A | 1/2000 |
| JP | 2000-053826 A | 2/2000 |
| JP | 3055111 B | 6/2000 |
| JP | 3463160 B | 11/2003 |
| JP | 3622888 B | 2/2005 |
| JP | 3945248 B | 7/2007 |
| JP | 3994611 B | 10/2007 |
| WO | 2013/169485 A1 | 11/2013 |

\* cited by examiner

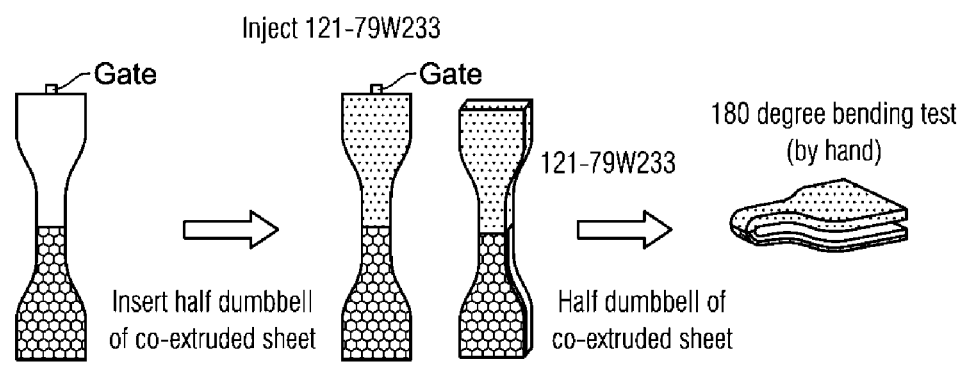
FIG. 5
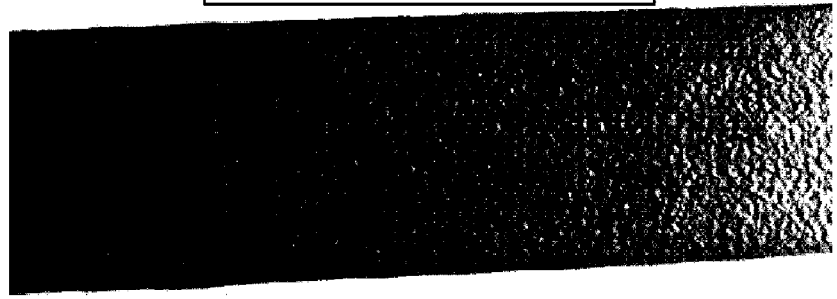
FIG. 6

Microscopy Image of Extrusion Tape Made with F01

Microscopy Image of Extrusion Tape Made with F09

Close-Up Microscopy Image of Extrusion Tape Made with F09

Microscopy Image of Extrusion Tape Made with G01

Microscopy Image of Extrusion Tape Made with G02

Microscopy Image of Extrusion Tape Made with G04

Microscopy Image of Extrusion Tape Made with G05

Close-Up Microscopy Image of Extrusion Tape Made with G05

Microscopy Image of Extrusion Tape Made with G06

Close-Up Microscopy Image of Made with G06

FIG. 16a
Microscopy Image of Extrusion Tape Made with D01

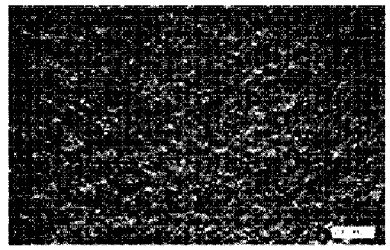

FIG. 16b
Microscopy Image of Extrusion Tape Made with D03

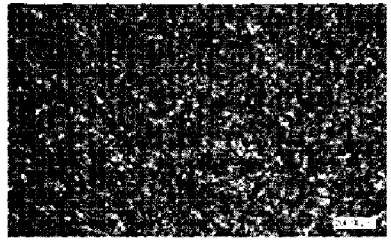

FIG. 16c
Microscopy Image of Extrusion Tape Made with D04

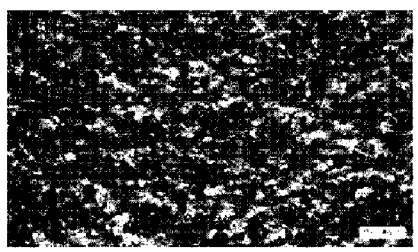

FIG. 16d
Microscopy Image of Extrusion Tape Made with D05

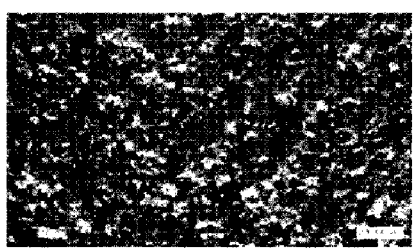

FIG. 16e
Microscopy Image of Extrusion Tape Made with D06

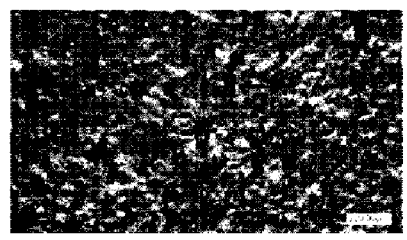

FIG. 16f
Microscopy Image of Extrusion Tape Made with D07

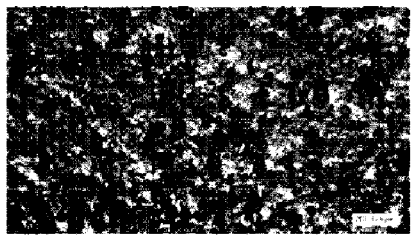

FIG. 16g
Microscopy Image of Extrusion Tape Made with D08

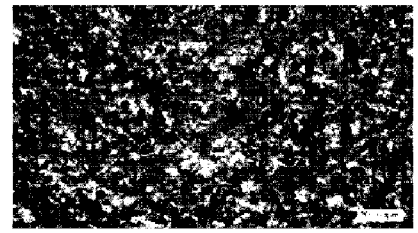

FIG. 16h
Microscopy Image of Extrusion Tape Made with D09

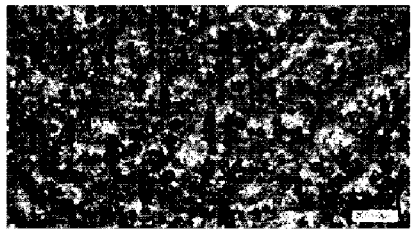

FIG. 17a
Microscopy Image of Extrusion Tape Made with D10

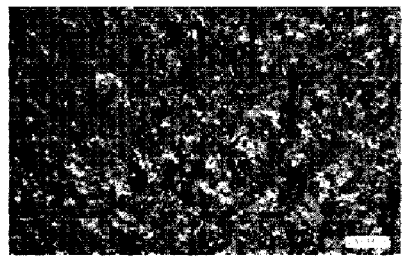

FIG. 17b
Microscopy Image of Extrusion Tape Made with D11

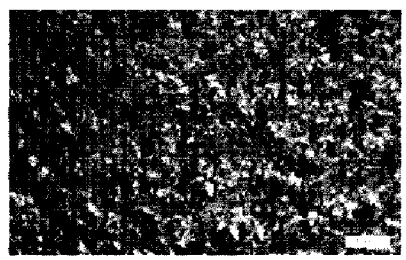

FIG. 17c
Microscopy Image of Extrusion Tape Made with D12

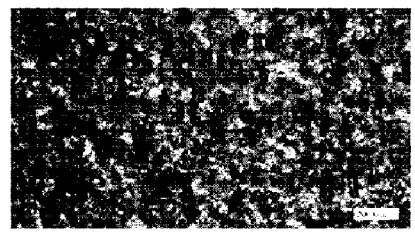

FIG. 17d
Microscopy Image of Extrusion Tape Made with D13

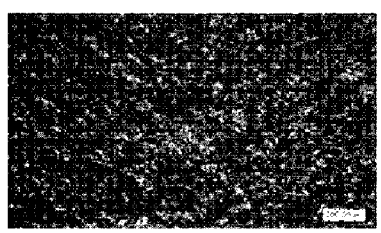

FIG. 17e
Microscopy Image of Extrusion Tape Made with D14

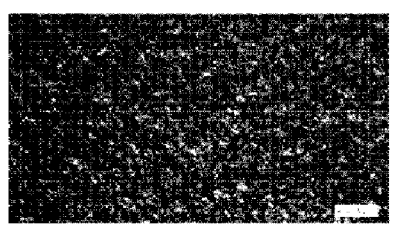

FIG. 17f
Microscopy Image of Extrusion Tape Made with D15

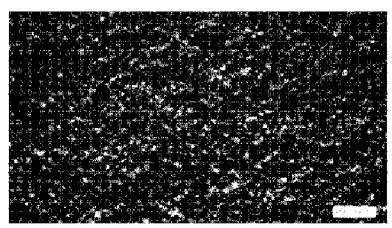

FIG. 17g
Microscopy Image of Extrusion Tape Made with D16

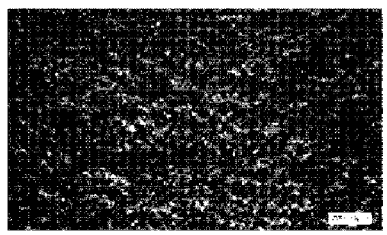

FIG. 17h
Microscopy Image of Extrusion Tape Made with D17

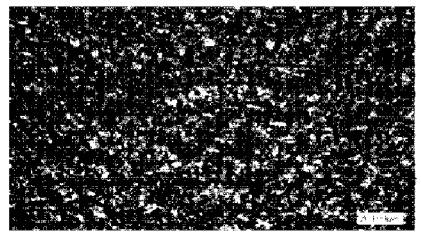

Microscopy Image of Extrusion Tape Made with D18

Microscopy Image of Extrusion Tape Made with D19

Microscopy Image of Extrusion Tape Made with D20

Microscopy Image of Extrusion Tape Made with D21

Microscopy Image of Extrusion Tape Made with D22

THERMOPLASTIC ELASTOMER COMPOSITIONS COMPRISING ULTRAHIGH MOLECULAR WEIGHT POLYETHYLENE AND METHODS FOR MAKING THE SAME

CROSS REFERENCE TO RELATED APPLICATION

This invention is a National Stage Application of International Application No. PCT/US2016/032433, filed May 13, 2016, and claims priority to and the benefit of U.S. Ser. No. 62/182,136, filed Jun. 19, 2015 and EP Application 15181733.5, filed on Aug. 20, 2015, the disclosures of which are incorporated by reference herein in their entireties.

FIELD OF THE INVENTION

Provided herein are thermoplastic elastomer compositions that comprise blends of thermoplastic vulcanizates and ultrahigh molecular weight polyethylene. The thermoplastic elastomer compositions are useful for window channel applications, and in particular for slip coat layers in window channel applications.

BACKGROUND OF THE INVENTION

Thermoplastic elastomer compositions, such as thermoplastic vulcanizates, have been used for a wide range of purposes, including automotive parts such as weatherstripping and window channels, also known as glass run channels ("GRC"). The window channel is typically made from a soft, resilient material that provides integrity and an environmental (e.g., rain) and/or acoustical (e.g., noise from wind) seal. In automotive applications, the window channel also provides a surface against which a retractable window can slide and seal. Therefore, in addition to providing an adequate seal from rain and wind, it is desirable that the window channel be abrasion resistant and demonstrate a low coefficient of friction to allow smooth movement (i.e., opening and closing) of the window.

Window channels are often made with a slip coat layer, such as a film layer or coextrusion layer that is applied over a substrate layer, typically a rubbery material. Slip coat layers have been made containing a variety of formulations. For example, slip coat layers have been made from blends of elastomers and silicone compounds, such as silicone oil. However, problems can arise when molding/extruding such a composition through a die as the silicone compound often adheres to the die leading to the formation of droplets and lumps. The droplets and lumps can then sag onto the extrusion molding or appear locally on the surface of the molding forming scale-like dappled patterns and large stripes. Additionally, over time, the silicone compound may bleed onto the surface of the slip coat layer, where the silicone oil can then be removed during repeated opening/closing of the window glass, leading to deterioration in the slide durability of the window channel.

Additional slip coat layers have been made that are a coextruded layer of an ultrahigh molecular weight polyethylene ("UHMWPE") resin on the surface of a substrate material. However, UHMWPE by itself has too high of a melt viscosity upon extrusion to uniformly form a thin coating. As a result, the surface coating is coarse and rough, leading to an unfavorable appearance. Additionally, repeated opening and shutting of the door/window can lead to undesirable whitening, cracking, and irregularities in the surface appearance of the coating.

U.S. Pat. No. 5,447,671 describes edging members for a window glass, where the rough surface contacting layer includes a blend of synthetic resins that have large and small particle sizes and different melting points. U.S. Pat. No. 6,146,739 describes a glass-run channel that includes a slide-resin layer that includes a blend of an ultra-high molecular weight polyolefin having an intrinsic viscosity of 7 to 40 dl/g, a polyolefin having an intrinsic viscosity of 0.1 to 5 dl/g, and a thermoplastic elastomer. U.S. Pat. No. 6,706,385 describes sliding members that are obtained by blending a thermoplastic olefin elastomer, and ultrahigh molecular weight polyolefin having a particle diameter of 1 to 10 mm, and an ultra-high molecular weight polyolefin powder having a particle diameter of 1 to 100 µm.

Additional background references include U.S. Pat. Nos. 5,110,685; 5,343,655; 5,378,543; 5,441,685; 5,424,019; 6,115,967; 6,368,700; 6,497,960; 6,499,256; 6,534,147; 6,660,360; 6,866,939; and 8,334,344; U.S. Patent Application Publication No. 2004/006170; PCT Publication No. WO2013/169485; Japanese Patent Nos. 2909799 B2, 3055111 B2, 3463160 B2, and 3622888 B2, 3945248 B2, 3994611 B2; and Japanese Application Publication Nos. 2000-025087, 2000-026668, and 2000-053826.

There still remains a need for improved weatherseals and window channels, and in particular slip coating layers of weatherseals and window channels. In particular, there is a need for slip coat layers that have desirable surface appearance and that exhibit good coefficient of friction and sliding performance.

BRIEF DESCRIPTION OF THE FIGURES

FIG. 5 illustrates the test method for the bonding test and the 180° bending test.

FIG. 6 is photographs of the extrusion tapes made with samples F01 and F02 in Example 1.

FIGS. 16a-16h are microscopy images of extrusion tapes made with samples D01, D03, D04, D05, D06, D07, D08, and D09.

FIGS. 17a-17h are microscopy images of extrusion tapes made with samples D10, D11, D12, D13, D14, D15, D16, and D17.

SUMMARY OF THE INVENTION

Figure 1:
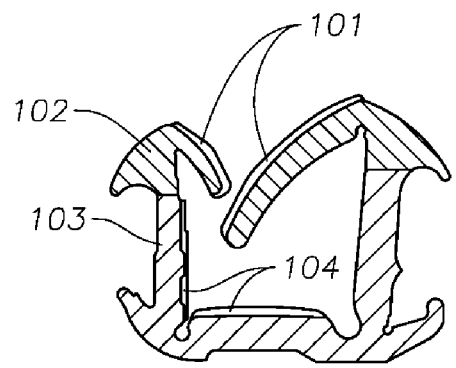
FIG. 1 is a schematic illustrating a typical glass run channel.

Provided herein are thermoplastic elastomer compositions that comprise thermoplastic vulcanizates and ultrahigh molecular weight polyethylene. For example, the thermoplastic elastomer composition may comprise 30-60 wt % of a thermoplastic vulcanizate, 5 to 25 wt % of a thermoplastic resin, 5 to 25 wt % of a high density polyethylene, and 5 to 40 wt % of an ultrahigh molecular weight polyethylene. In some embodiments, the thermoplastic vulcanizate may comprise 20 to 60 wt % of thermoplastic resin, 10 to 40 wt % of rubber, and 15 to 50 wt % of oil.

In some embodiments, the thermoplastic elastomer composition may comprise 5-30 wt %, or 7 to 15 wt %, of the ultrahigh molecular weight polyethylene. In some embodiments, the ultrahigh molecular weight polyethylene has an average particle size of less than 75 µm. In some embodiments, the ultrahigh molecular weight polyethylene has a weight average molecular weight of greater than 1,500,000 g/mol.

The thermoplastic elastomer compositions may be particularly useful in forming laminates, such as slip coat laminates for glass run channels. For example, the laminate may comprise a first layer comprising a thermoplastic vulcanizate and a second layer comprising the thermoplastic elastomer composition. In some embodiments, the slip coat layer of the laminate (i.e., the layer comprising the thermoplastic elastomer composition) may have a surface roughness of from 1 to 6 µm and/or a kinetic coefficient of friction at dry conditions of less than 0.5.

DETAILED DESCRIPTION OF THE INVENTION

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

All numerical values within the detailed description and the claims herein are modified by "about" or "approximately" the indicated value, and take into account experimental error and variations that would be expected by a person having ordinary skill in the art.

Provided herein are thermoplastic elastomer compositions that comprise blends of thermoplastic vulcanizates and ultrahigh molecular weight polyethylene. The thermoplastic elastomer compositions are useful for window channel applications, and in particular for slip coat layers in window channel applications. Desirably the thermoplastic elastomer compositions and laminates made containing such compositions may have a low coefficient of friction on glass over a wide temperature range, such as from −30 to 80° C. at dry, wet, and semi-wet conditions. Additionally the thermoplastic elastomer compositions and laminates made containing such compositions may have good abrasion and wear resistance while having a desirable smooth surface appearance.

Thermoplastic Vulcanizate

The thermoplastic elastomer compositions described herein comprise a thermoplastic vulcanizate. As used herein, a "thermoplastic vulcanizate" or "TPV" is broadly defined as any material that includes a dispersed, at least partially vulcanized, rubber within a thermoplastic resin. A TPV composition can further include oil, additives, and combinations thereof.

As used herein, the term "vulcanizate" means a composition that includes some component (e.g., rubber) that has been vulcanized. The term "vulcanized" is defined herein in its broadest sense, and refers in general to the state of a composition after all or a portion of the composition (e.g., crosslinkable rubber) has been subjected to some degree or amount of vulcanization. Accordingly, the term encompasses both partial and total vulcanization. A preferred type of vulcanization is "dynamic vulcanization," discussed below, which also produces a "vulcanizate." In at least that context, the term vulcanization encompasses any form of curing (crosslinking), both thermal and chemical, which can be utilized in dynamic vulcanization.

As used herein, the term "dynamic vulcanization" means vulcanization or curing of a curable rubber blended with a thermoplastic resin under conditions of shear at temperatures sufficient to plasticize the mixture. In preferred embodiments, the rubber is simultaneously crosslinked and dispersed as micro-sized particles within the thermoplastic resin. Depending on the degree of cure, the rubber to thermoplastic resin ratio, compatibility of the rubber and thermoplastic resin, the kneader type and the intensity of mixing (shear rate), other morphologies, such as co-continuous rubber phases in the plastic matrix, are possible.

As used herein, a "partially vulcanized" rubber is one wherein more than 5 weight percent (wt %) of the crosslinkable rubber is extractable in boiling xylene, subsequent to vulcanization (preferably dynamic vulcanization), e.g., crosslinking of the rubber phase of the TPV. For example, in a TPV comprising a partially vulcanized rubber at least 5 wt % and less than 20 wt %, or 30 wt %, or 50 wt % of the crosslinkable rubber can be extractable from the specimen of the TPV in boiling xylene.

Preferably, the percent of soluble rubber in the cured composition is determined by refluxing a specimen in boiling xylene, weighing the dried residue and making suitable corrections for soluble and insoluble components based upon knowledge of the composition. Thus, corrected initial and final weights are obtained by subtracting from the initial weight of the soluble components, other than the rubber to be vulcanized, such as extender oils, plasticizers, and components of the compositions soluble in organic solvent, as well as thermoplastic components that are not intended to cure. Any insoluble pigments, fillers, etc., are subtracted from both the initial and final weights. Any materials in the uncured rubber that are soluble in refluxing xylene are subtracted from the rubber when calculating the percent of soluble rubber in a cured composition. A further description of the technique for determining the percentage of extractable rubber is set forth in U.S. Pat. No. 4,311,628, and the portions of the patents referring to that technique are hereby incorporated by reference.

As used herein, a "fully vulcanized" (or fully cured or fully crosslinked) rubber is one wherein less than 5 wt % of the crosslinkable rubber is extractable in boiling xylene, subsequent to vulcanization (preferably dynamic vulcanization), e.g., crosslinking of the rubber phase of the TPV. For example, in a TPV comprising a fully vulcanized rubber less than 4 wt %, or less than 3 wt %, or less than 2 wt %, or less than 1 wt % of the crosslinkable rubber can be extractable from the specimen of the TPV in boiling xylene. In some embodiments, in a TPV comprising a fully vulcanized rubber from 0.5 to 2.0 wt % of the crosslinkable rubber can be extractable from the specimen of the TPV in boiling xylene.

The TPV may be present in the thermoplastic elastomer composition in an amount greater than 30 wt %, or greater than 35 wt %, or greater than 40 wt %, or greater than 43 wt %, or greater than 45 wt %, based on the weight of the thermoplastic elastomer composition. The TPV may be present in the thermoplastic elastomer composition in an amount of less than 60 wt %, or less than 55 wt %, or less than 50 wt %, or less than 48 wt %. In some embodiments, the TPV is present in the thermoplastic elastomer composition in an amount of from 30 to 60 wt %, or from 40 to 50 wt %, or from 43 to 48 wt %.

Rubber Component

The TPVs described herein comprise a rubber component. The "rubber component" can be any material that is considered by persons skilled in the art to be a "rubber", preferably a crosslinkable rubber (i.e., prior to vulcanization) or crosslinked rubber (i.e., after vulcanization). The rubber component may comprise one rubber or may comprise blends of two or more rubbers, where the rubbers are different in composition or are the same in composition but have different properties.

Non-limiting examples of useful rubbers include olefin-containing rubbers, butyl rubber, natural rubber, styrene-butadiene copolymer rubber, butadiene rubber, acrylonitrile rubber, halogenated rubbers such as brominated and chlorinated isobutylene-isoprene copolymer rubber, butadiene-styrene-vinyl pyridine rubber, urethane rubber, polyisoprene rubber, epichlorohydrin terpolymer rubber, polychloroprene rubber, and mixtures thereof. In preferred embodiments, the rubber is an olefin-containing rubber, such as an ethylene-$\alpha$-olefin copolymer rubber, such as an ethylene-$\alpha$-olefin-diene rubber.

The rubber may be an ethylene-$\alpha$-olefin copolymer rubber comprising an $\alpha$-olefin having 3 to 8 carbon atoms, such as, for example propylene. The ethylene-$\alpha$-olefin rubber may contain at least 50 wt %, or at least 55 wt %, or at least 60 wt % of ethylene-derived units based on the weight of the ethylene-$\alpha$-olefin rubber, with the balance of the units being $\alpha$-olefin derived.

In preferred embodiments, the rubber component comprises an ethylene-$\alpha$-olefin-diene rubber. The ethylene-$\alpha$-olefin-diene rubber may comprise an $\alpha$-olefin having 3 to 8 carbon atoms. In preferred embodiments the $\alpha$-olefin is propylene, and the rubber is an ethylene-propylene-diene rubber ("EPDM"). Preferably the diene in the ethylene-$\alpha$-olefin-diene rubber is a nonconjugated diene. Suitable non-conjugated dienes include 5-ethylidene-2-norbornene ("ENB"); 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene ("DCPD"); 5-vinyl-2-norbornene ("VNB"); divinyl benzene; and combinations thereof. In some embodiments, the ethylene-$\alpha$-olefin-diene rubber comprises diene-derived units derived from ENB, VNB, or combinations thereof. In preferred embodiments, the ethylene-$\alpha$-olefin diene rubber consists essentially of, or consists only of, units derived from ethylene, propylene, and ENB.

The ethylene-$\alpha$-olefin-diene rubber may contain at least 50 wt %, or at least 55 wt %, or at least 60 wt % ethylene-derived units, based in the weight of the ethylene-$\alpha$-olefin-diene rubber. In some embodiments, the ethylene-$\alpha$-olefin-diene rubber contains from 50 to 90 wt % ethylene-derived units, or from 50 to 85 wt %, or from 55 to 80 wt %, or from 55 to 75 wt %, or from 60 to 70 wt % ethylene-derived units, based on the weight of the ethylene-$\alpha$-olefin-diene rubber, where desirable ranges may include ranges from any lower limit to any upper limit. The amount of ethylene-derived units in the copolymer may be determined according to ASTM D3900. In the ethylene-$\alpha$-olefin-diene rubber, the diene-derived units may be present in an amount of at least 0.1 wt %, or at least 1 wt %, or at least 2 wt %, or at least 3 wt %, or at least 4 wt %, based on the weight of the ethylene-$\alpha$-olefin-diene rubber. In some embodiments, the ethylene-$\alpha$-olefin-diene rubber may contain from about 0.1 to about 10 wt %, or from about 1 to about 9 wt %, or from about 2 to about 8 wt %, or from about 3 to about 7 wt %, or from about 4 to about 6 wt % diene-derived units, based on the weight of the ethylene-$\alpha$-olefin-diene rubber, where desirable ranges may include ranges from any lower limit to any upper limit. The wt % of diene-derived units may be determined according to ASTM D-6047. The balance of the ethylene-$\alpha$-olefin-diene rubber will generally be made up of units derived from $\alpha$-olefin, such as propylene. Accordingly, the ethylene-$\alpha$-olefin-diene rubber may contain at least 10 wt %, or at least 15 wt %, or at least 20 wt %, or at least 25 wt %, or at least 30 wt % $\alpha$-olefin derived units, based on the weight of the ethylene-$\alpha$-olefin-diene rubber. In some embodiments, the ethylene-$\alpha$-olefin diene rubber may contain from about 10 to about 50 wt %, or from about 15 to about 45 wt %, or from about 20 to about 40 wt %, or from about 25 to about 35 wt % $\alpha$-olefin derived units, based on the weight of the ethylene-$\alpha$-olefin-diene rubber, where desirable ranges may include ranges from any lower limit to any upper limit.

The ethylene-$\alpha$-olefin rubber or the ethylene-$\alpha$-olefin-diene rubber may have a weight average molecular weight (Mw) that is greater than 100,000, or greater than 200,000, or greater than 400,000, or greater than 600,000 daltons. The Mw of the ethylene-$\alpha$-olefin rubber or the ethylene-$\alpha$-olefin-diene rubber may be less than 1,200,000, or less than 1,000,000, or less than 900,000, or less than 800,000 daltons. Useful ethylene-$\alpha$-olefin rubbers and ethylene-$\alpha$-olefin-diene rubbers may have a number average molecular weight (Mn) that is greater than 20,000, or greater than 60,000, or greater than 100,000, or greater than 150,000 daltons. The Mn of the ethylene-$\alpha$-olefin rubber or the ethylene-$\alpha$-olefin-diene rubber may be less than 500,000, or less than 400,000, or less than 300,000, or less than 250,000 daltons. Techniques for determining the molecular weight ($M_n$, $M_w$, and $M_z$) and molecular weight distribution (MWD) may be found in U.S. Pat. No. 4,540,753, which is incorporated by reference herein, and references cited therein and in *Macromolecules,* 1988, volume 21, p. 3360 by Ver Strate et al., which is also herein incorporated by reference, and references cited therein.

The ethylene-$\alpha$-olefin rubber or the ethylene-$\alpha$-olefin-diene rubber may also be characterized by having a Mooney viscosity (ML(1+4) at 125° C.) per ASTM D-1646, of from about 10 to about 250, or from about 20 to about 100, or from about 30 to about 75, or from about 40 to about 60, where desirable ranges may include ranges from any lower limit to any upper limit. As used herein, Mooney viscosity is reported using the format: Rotor ([pre-heat time in minutes]+[shearing time in minutes] @ measurement temperature in ° C.), such that ML (1+4@125° C.) indicates a Mooney viscosity determined using the ML or large rotor according to ASTM D1646-99, for a pre-heat time of 1 minute and a shear time of 4 minutes, at a temperature of 125° C. In some embodiments, the ethylene-$\alpha$-olefin rubber or the ethylene-$\alpha$-olefin-diene rubber is oil extended and the Mooney viscosity of the oil-extended rubber is from about 10 to about 250, or from about 20 to about 100, or from about 30 to about 75, or from about 40 to about 60, where desirable ranges may include ranges from any lower limit to any upper limit.

The ethylene-α-olefin rubber or the ethylene-α-olefin-diene rubber may be characterized by having an intrinsic viscosity, as measured in decalin at 135° C. per ASTM D-1601, of from about 1 to about 8 dl/g, or from about 3 to about 7 dl/g, or from about 4 to about 6.5 dl/g, where desirable ranges may include ranges from any lower limit to any upper limit.

The ethylene-α-olefin rubber or the ethylene-α-olefin-diene rubber may be characterized by a glass transition temperature ($T_g$), as determined by Differential Scanning Calorimetry (DSC) according to ASTM E-1356, that is less than −20° C., or less than −30° C., or less than −50° C., or from about −20 to about −60° C.

The ethylene-α-olefin and the ethylene-α-olefin-diene rubbers described herein may be manufactured or synthesized by using a variety of techniques. For example, these copolymers can be synthesized by employing solution, slurry, or gas phase polymerization techniques that employ various catalyst systems. Exemplary catalysts include Ziegler-Natta systems such as those including vanadium catalysts, and single-site catalysts including constrained geometry catalysts, or metallocene catalysts. Useful ethylene-α-olefin rubbers and ethylene-α-olefin-diene rubbers include some grades of rubbers commercially available under the tradenames Vistalon™ (ExxonMobil Chemical Co.; Houston, Tex.), Keltan™ (DSM Copolymers), Nordel™ IP (Dow), Nordel™ MG (Dow), Royalene™ (Lion Copolymer), and Buna™ (Lanxess).

The rubber component may be present in the TPV in an amount of from a low of about 10 wt %, 15 wt %, 20 wt %, or 25 wt % to a high of about 30 wt %, 35 wt %, 40 wt %, or 45 wt % based on total weight of the TPV composition, where desirable ranges may include ranges from any lower limit to any upper limit. In some embodiments, the rubber component may consist essentially of, or consist only of, ethylene-α-olefin-diene rubber, and the TPV may contain from a low of 20 wt %, 21 wt %, 22 wt %, 23 wt %, 24 wt % or 25 wt % to a high of about 29 wt %, 30 wt %, 31 wt %, 32 wt %, 33 wt %, 34 wt %, or 35 wt % of the ethylene-α-olefin-diene rubber, based on the weight of the total TPV, where desirable ranges may include ranges from any lower limit to any upper limit.

Thermoplastic Resin Component

The TPV also contains one or more thermoplastic resins. The thermoplastic resin may be any material that is not a "rubber" as described herein. For example, the thermoplastic resin may be a polymer or polymer blend considered by persons skilled in the art as being thermoplastic in nature, e.g., a polymer that softens when exposed to heat and returns to its original condition when cooled to room temperature.

Illustrative thermoplastic resins may be polyolefins prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof, and copolymers thereof. Preferably, the olefinic thermoplastic resin is unvulcanized or non cross-linked.

In preferred embodiments, the thermoplastic resin component further comprises a polypropylene. Preferably, the polypropylene used in the compositions described herein has a melting point above 110° C. and includes at least 90 wt % propylene-derived units. The polypropylene may also include isotactic, atactic or syndiotactic sequences, and preferably includes isotactic sequences. The polypropylene can either derive exclusively from propylene monomers (i.e., having only propylene-derived units) or comprises at least 90 wt %, or at least 93 wt %, or at least 95 wt %, or at least 97 wt %, or at least 98 wt %, or at least 99 wt % propylene-derived units with the remainder derived from olefins, such as ethylene, and/or $C_4$-$C_{10}$ α-olefins.

The thermoplastic resin may have a melting temperature of from at last 110° C., or at least 120° C., or at least 130° C., and may range from 110° C. to 170° C. or higher as measured by DSC.

The thermoplastic resin may have a melt flow rate "MFR" as measured by ASTM D1238 at 230° C. and 2.16 kg weight of from about 0.1 to 100 g/10 min. In preferred embodiments, the additional thermoplastic resin may be a fractional MFR, such a polypropylene having a fractional MFR of less than about 2 g/10 min, or less than about 1.5 g/10 min, or less than about 1 g/10 min. The TPV may also comprises a thermoplastic resin, such as a polypropylene, having a MFR of from a low of about 25, 26, 27, 28, 29, 30, 31, 32, or 33 g/10 min to a high of about 37, 38, 39, 40, 41, 42, 43, 44, or 45 g/10 min, where desirable ranges may include ranges from any lower limit to any upper limit. In some embodiments, the TPV may further comprise a thermoplastic resin, such as a polypropylene, having a MFR of from a low of about 5, 10, or 15 g/10 min to a high of about 20, 25, or 30 g/10 min, where desirable ranges may include ranges from any lower limit to any upper limit.

In some embodiments, the thermoplastic resin component may further comprise a propylene-based elastomer ("PBE"). The PBE may comprise propylene and from about 5 to about 30 wt % of one or more comonomers selected from ethylene and/or $C_4$-$C_{12}$ α-olefins. The PBE may have a melting temperature (as determined by DSC) of less than about 110° C., less than about 100° C., less than about 90° C., less than about 80° C., less than about 70° C., less than about 65° C., less than about 60° C. The PBE may be characterized by an Hf of less than about 60 J/g, less than about 50 J/g, less than about 40 J/g, less than about 35 J/g, less than about 30 J/g, less than about 25 J/g, less than about 20 J/g, less than about 15 J/g. The PBE is preferably prepared using homogeneous conditions, such as a continuous solution polymerization process. Exemplary methods for the preparation of propylene-based polymer may be found in U.S. Pat. Nos. 6,881,800; 7,803,876; 8,013,069; and 8,026,323 and PCT Publications WO 2011/087729; WO 2011/087730; and WO 2011/087731.

In some embodiments, the thermoplastic phase of the TPV may further comprise a PBE that is a propylene-ethylene copolymer that has from about 9 wt % to about 15 wt % or from about 10 to about 12 wt %, ethylene-derived units and has at least three, or at least four, or at least five, or at least six, or at least seven, or all eight of the following properties (i) a Tm of from about 45 to about 65° C., or from about 50 to about 60° C., or from about 52 to about 58° C.; (ii) a Hf of from about 1.0 to about 25 J/g, from about 5.0 to about 20 J/g, from about 10 to 20 J/g, or from about 12 to about 18 J/g; (iii) a MI of from about 0.5 to about 3.0 g/10 min or from about 0.75 to about 2.0 g/10 min; (iv) a MFR of from about 0.5 to about 7.0 g/10 min, or from about 1.0 to about 6.0 g/10 min, or from about 2.0 to about 5.0 g/10 min; (v) a Mw of from about 240,000 to about 300,000 daltons, or from about 250,000 to about 280,000 daltons, or from about 260,000 to about 270,000 daltons; (vi) a Mn of from about 110,000 to about 140,000 daltons, from about 115,000 to about 135,000 daltons, or from about 120,000 to about 130,000 daltons; (vii) a Mz of from about 370,000 to about 420,000 daltons, from about 380,000 to about 410,000 daltons, or from about 385,000 to about 400,000 daltons; and/or (viii) a Mooney viscosity of from about 10 to about 40, or from about 15 to about 37, or from about 20 to about 35, or from about 25 to about 30.

The thermoplastic resin component may be present in the TPV in an amount of from a low of about 10 wt %, 15 wt %, 20 wt %, 25 wt %, 30 wt %, or 35 wt % to a high of about 40 wt %, 45 wt %, 50 wt %, 55 wt %, or 60 wt % based on total weight of the TPV composition, where desirable ranges may include ranges from any lower limit to any upper limit.

Oil

The thermoplastic vulcanizates herein further comprise oil, such as process oils and extender oils. As used herein, process oils are oils that are added directly to the vulcanization process, as compared to extender oils which are oils that are pre-blended with the rubber to extend the rubber prior to vulcanization.

The oils that may be used include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include alpha olefinic synthetic oils, such as liquid polybutylene. Additive oils other than petroleum based oils can also be used, such as oils derived from coal tar and pine tar, as well as synthetic oils, e.g., polyolefin materials.

Oil can be present in the TPV in an amounts of from about 5 to about 300 parts, or from 30 to 250 parts, or from 70 to 200 parts, by weight per 100 parts by weight of total weight of the rubber component and thermoplastic component, where desirable ranges may include ranges from any lower limit to any upper limit.

In some embodiments, oil may be present in the TPV in an amount of from a low of about 10 wt %, or 15 wt %, or 20 wt %, or 25 wt %, or 30 wt %, to a high of about 40 wt %, or 45 wt %, or 50 wt %, or 55 wt %, based on the total weight of the TPV, where desirable ranges may include ranges from any lower limit to any upper limit.

Alternatively, the quantity of oil used can be defined on the basis of the amount of oil introduced to the vulcanization process before the curative is introduced ("pre-cure oil"), oil introduced with the curative, and the amount of oil introduced to the vulcanization process after the curative is introduce ("post-cure oil"). The pre-cure oil may be oil that comes from oil-extended oil and/or process-oil that is directly introduced to the vulcanization process before the curative is added. For example, the amount of pre-cure oil may range from a low of about 55 wt %, or 56 wt %, or 57 wt %, or 58 wt %, or 59 wt %, or 60 wt % to a high of about 65 wt %, or 66 wt %, or 67 wt %, or 68 wt %, or 69 wt %, or 70 wt %, based on the total amount of oil in the TPV, where desirable ranges may include ranges from any lower limit to any upper limit. For example, the amount of post-cure oil may range from a low of about 25 wt %, 26 wt %, 27 wt %, 28 wt %, 29 wt %, 30 wt %, or 31 wt %, to a high of about 40 wt %, or 41 wt %, or 42 wt %, or 43 wt %, or 44 wt %, or 45 wt %, or 46 wt %, based on the total amount of oil in the TPV, where desirable ranges may include ranges from any lower limit to any upper limit. For example, the amount of oil introduced with the curative may range from a low of 1 wt %, or 2 wt %, or 3 wt %, or 4 wt %, to a high of about 7 wt %, or 8 wt %, or 9 wt %, or 10 wt %, based on the total amount of oil in the TPV, where desirable ranges may include ranges from any lower limit to any upper limit.

Vulcanizing Agent

Any vulcanizing agent that is capable of curing or cross-linking the rubber employed in preparing the TPV may be used. For example, the cure agent may include peroxides, phenolic resins, free radical curatives, hydrosilation curatives, or other curatives conventionally employed.

In preferred embodiments, the TPV is cured using a phenolic resin vulcanizing agent. The preferred phenolic resin curatives can be referred to as resole resins, which are made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms are preferred. In some embodiments, a blend of octyl phenol and nonylphenol-formaldehyde resins are employed. The blend may include from 25 wt % to 40 wt % octyl phenol and from 75 wt % to 60 wt % nonylphenol, more preferably, the blend includes from 30 wt % to 35 wt % octyl phenol and from 70 wt % to 65 wt % nonylphenol. In some embodiments, the blend includes about 33 wt % octylphenol-formaldehyde and about 67 wt % nonylphenol formaldehyde resin, where each of the octylphenol and nonylphenol include methylol groups. This blend can be solubilized in paraffinic oil at about 30% solids.

Useful phenolic resins may be obtained under the tradenames SP-1044, SP-1045 (Schenectady International; Schenectady, N.Y.), which may be referred to as alkylphenol-formaldehyde resins (also available in a 30/70 weight percent paraffinic oil solution under the trade name HRJ-14247A). SP-1045 is believed to be an octylphenol-formaldehyde resin that contains methylol groups. The SP-1044 and SP-1045 resins are believed to be essentially free of halogen substituents or residual halogen compounds. By "essentially free of halogen substituents," it is meant that the synthesis of the resin provides for a non-halogenated resin that may only contain trace amounts of halogen containing compounds.

The curative may be used in conjunction with a cure accelerator, a metal oxide, an acid scavenger, and/or polymer stabilizers. Useful cure accelerators include metal halides, such as stannous chloride, stannous chloride anhydride, stannous chloride dihydrate and ferric chloride. The cure accelerator may be used to increase the degree of vulcanization of the TPV, and in some embodiments may be added in an amount of less than 1 wt % based on the total weight of the TPV. In preferred embodiments, the cure accelerator comprises stannous chloride. In some embodiments, the cure accelerator is introduced into the vulcanization process as part of a masterbatch.

In some embodiments, metal oxides may be added to the vulcanization process. It is believed that the metal oxide can act as a scorch retarder in the vulcanization process. Useful metal oxides include zinc oxides having a mean particle diameter of about 0.05 to about 0.15 μm. Useful zinc oxide can be obtained commercially under the tradename Kadox™ 911 (Horsehead Corp.).

In some embodiments, the curative, such as a phenolic resin, is used in conjunction with an acid scavenger. The acid scavenger may be added downstream of the curative after the desired level of cure has been achieved. Useful acid scavengers include hydrotalcites. Both synthetic and natural hydrotalcites can be used. Exemplary natural hydrotalcite can be represented by the formula $Mg_6Al_2(OH)_{1-6} CO_3 \cdot 4H_2O$. Synthetic hydrotalcite compounds, which are believed to have the formula: $Mg_{4.3}Al_2(OH)_{12.6}CO_3 mH_2O$ or $Mg_{4.5}Al_2(OH)_{13}CO_{3.3} \cdot 5H_2O$, can be obtained under the tradenames DHT-4A™ or Kyowaad™ 1000 (Kyowa, Japan). Another commercial example is that available under the trade name Alcamizer™ (Kyowa).

The curative, such as a phenolic resin, may be introduced into the vulcanization process in a solution or as part of a dispersion. In preferred embodiments, the curative is introduced to the vulcanization process in an oil dispersion/solution, such as a curative-in-oil or a phenolic resin-in-oil, where the curative/resin is dispersed and/or dissolved in a process oil. The process oil used may be a mineral oil, such as an aromatic mineral oil, naphthenic mineral oil, paraffinic mineral oils, or combination thereof.

The vulcanizing agent can be present in an amount effective to produce the desired amount of cure within the rubber phase. In certain embodiments, the vulcanizing agent is present in an amount of from 0.01 phr to 50 phr, or from 0.05 phr to 40 phr, or from 0.1 phr to 30 phr, or from 0.5 phr to 25 phr, or from 1.0 phr to 20 phr, or from 1.5 phr to 15 phr, or from 2.0 phr to 10 phr.

In embodiments where a phenolic resin is used, the phenolic resin may be employed in an amount from about 0.1 to 10 parts by weight, or from about 2 to about 6 parts by weight, or from about 3 to about 5 parts by weight, or from about 4 to about 5 parts by weight per 100 parts by weight of rubber. A complementary amount of stannous chloride may include from about 0.5 to about 2.0 parts by weight, or from about 1.0 to about 1.5 parts by weight, or from about 1.2 to about 1.3 parts by weight per 100 parts by weight of rubber. In conjunction therewith, from about 0.1 to about 6.0 parts by weight, or from about 1.0 to about 5.0 parts by weight, or from about 2.0 to about 4.0 parts by weight of zinc oxide may be employed. In one or more embodiments, the rubber employed with the phenolic curatives includes diene units deriving from 5-ethylidene-2-norbornene.

Additives

The TPV may further comprise one or more additives. These additives may be present in addition to, or in place of the additives which may be present in the rubber and thermoplastic resin compositions used to make the TPV. Suitable additives include, but are not limited to, plasticizers, fillers, and processing aids.

The TPV composition may also include reinforcing and non-reinforcing fillers, antioxidants, stabilizers, antiblocking agents, anti-static agents, waxes, foaming agents, pigments, flame retardants and other processing aids known in the rubber compounding art. Fillers and extenders that can be utilized include conventional inorganics such as calcium carbonate, clays, silica, talc, titanium dioxide, carbon black, as well as organic and inorganic nanoscopic fillers. Fillers, such as carbon black, may be added as part of a masterbatch, and for example may be added in combination with a carrier such as polypropylene.

In one or more embodiments, the TPV includes at least about 5 wt %, 6 wt %, 7 wt %, 8 wt %, 9 wt %, or 10 wt % or of one or more fillers, such as calcium carbonate, clays, silica, talc, titanium dioxide, carbon black, and blends thereof, based on the weight of the TPV. In preferred embodiments, the TPV includes clay and/or carbon black in an amount ranging from a low of about 5 wt %, 6 wt %, 7 wt %, 8 wt %, 9 wt %, or 10 wt % to a high of about 15 wt %, 16 wt %, 17 wt %, 18 wt %, 19 wt %, or 20 wt %, based on the total weight of the TPV.

Making the Thermoplastic Vulcanizate

Any process for making TPVs may be employed. In one or more embodiments, the individual materials and components, such as the one or more rubber components, thermoplastic resin components, additive oils, curatives, other additives, etc., may be blended by melt-mixing in any order in a mixer heated to above the melting temperature of the thermoplastic resin component.

The one or more components, thermoplastic resin components, and curing agents can be added to a heated mixer as individual feed streams, as a tumbled blend, or as a masterbatch. The one or more thermoplastic resin components can be added before cure or divided in any proportions between before cure and after cure. The additive oil, e.g. process oil, can be added during mastication before cure, after cure, or divided in any proportions between before cure and after cure.

Preferably, the one or more curing agents are incorporated into the melt within a target range of melt temperature over a specified period of time (<120 seconds). The one or more curing agents can be added using any suitable technique, such as by injection as a solution in a compatible process oil, as a neat solid, as a neat melt, or as a masterbatch, for example.

One or more fillers or other additives can be introduced to the melt either before, during or after the cure. The additives, fillers or other compounds, which may interfere with the curing agents, should be added after curing reaches the desired level. Preferably, those additives are added to the melt as a slurry or paste in a compatible rubber process oil. Powder blends or masterbatches of these components can be prepared in a wax or polymer carrier to facilitate metering and mixing. Following the cure and sufficient mixing of the melt, the melt blend can be processed to form an elastomeric structure using any one or more of the following techniques: milling, chopping, extrusion, pelletizing, injection molding, or any other desirable technique. Additional details for making TPV compositions are described in U.S. Pat. No. 4,594,390.

Any process for making TPVs can be employed, so long as the propylene copolymer is added prior to the dynamic vulcanization of the crosslinkable rubber. For example, the individual materials and components, such as the one or more rubber components, polyolefinic thermoplastic resin components, thermoplastic modifiers, including the propylene copolymer, curing agents, additive oils, and other additives, can be mixed at a temperature above the melting temperature of the thermoplastic components to form a melt. Illustrative mixing equipment include: extruders with kneaders or mixing elements with one or more mixing tips or flights, extruders with one or more screws, and extruders of co or counter rotating type. Suitable mixing equipment also includes Brabender™ mixers, Banbury™ mixers, Buss mixers and kneaders, and Farrell Continuous mixers, for example. One or more of those mixing equipment, including extruders, can be used in series.

The one or more polyolefinic thermoplastic resin components, thermoplastic modifiers, rubber components, and curing agents can be added to a heated mixer as individual feed streams, as a tumbled blend, or as a masterbatch. The one or more polyolefinic thermoplastic resin components can be added before cure, after cure, or divided in any proportions between before cure and after cure. Similarly, the one or more thermoplastic modifiers, including portions of one or more of the one or more propylene copolymers, can be added before cure, after cure, or divided in any proportions between before cure and after cure. The additive oil, e.g. process oil, can be added during mastication, before cure, after cure, or divided in any proportions between before cure and after cure.

Preferably, the one or more curing agents are incorporated into the melt within a target range of melt temperature over a specified period of time (<120 seconds). The one or more curing agents can be added using any suitable technique, such as by injection as a solution in a compatible process oil, as a neat solid, as a neat melt, or as a masterbatch, for example. In the event a peroxide curative is used, the rubber components, peroxide curatives and enough of the one or more thermoplastic resin components to provide the plastic matrix, in which the rubber disperses, are blended to form the melt. Once the desired cure level is achieved, the remainder of the one or more thermoplastic resin components is added in any proportions to avoid any unintended break down or cross-linking of the one or more thermoplastic resin components. A side feeder for a single screw or twin screw extruder can be used to add the remaining portions of the thermoplastic resin components. In which case, the side feeder is preferably positioned after (downstream) the desired level of cure is obtained within the extruder.

The one or more mineral fillers and other additives can be introduced to the melt before, during or after cure. The additives, fillers or other compounds, which can interfere with the curing agents, should be added after curing reaches the desired level. Preferably, the one or more mineral fillers and other additives are added to the melt as a slurry or paste in a compatible rubber process oil. Powder blends or masterbatches of these components can be prepared in a wax or polymer carrier to facilitate metering and mixing. A side feeder can also be used to add the one or more mineral fillers and other additives.

The required mixing for discrete rubber phase morphology and properties can be developed through choice of screw design and screw speed. It is convenient to follow the progression of vulcanization (crosslinking) by monitoring melt temperature or mixing energy or mixing torque requirements during mixing. The mixing torque or mixing energy curve generally goes through a maximum after which the mixing can be continued to achieve the desirable cure level (state) and improve the fabricability for the blend. Following the cure and sufficient mixing of the melt, the melt blend can be processed to form an elastomeric structure using any one or more of the following techniques: milling, chopping, extrusion, pelletizing, injection molding, or any other desirable technique. Additional details for making a TPV are described in U.S. Pat. No. 4,594,390.

Ultrahigh Molecular Weight Polyethylene

The thermoplastic elastomer compositions described herein comprise one or more ultrahigh molecular weight polyethylenes ("UHMWPE"). The UHMWPE is a polyethylene polymer that comprises primarily ethylene-derived units. In some embodiments, the UHMWPE is a homopolymer of ethylene. In other embodiments, the UHMWPE is a copolymer of ethylene and an α-olefin such as 1-butene, 1-pentene, 1-hexene, 1-octene, 1-decene, 1-dodecene, 4-methyl-1-pentene, or 3-methyl-1-pentene.

The UHMWPE preferably has a weight average molecular weight of greater than 1,500,000 g/mol, or greater than 1,750,000 g/mol, or greater than 1,850,000 g/mol, or greater than 1,900,000 g/mol.

The UHMWPE may have a density greater than 0.91 g/mol, or greater than 0.92 g/cc, or greater than 0.93 g/cc. In some embodiments, the UHMWPE has a density of from 0.91 to 0.96 g/cc, or from 0.92 to 0.95 g/cc.

The UHMWPE may have a bulk specific gravity (ASTM D1895) of greater than 0.3 g/cc, or greater than 0.32 g/cc, or greater than 0.35 g/cc, or 0.0.37 g/cc.

The UHMWPE may have a Shore D hardness of greater than 50, or greater than 55, or greater than 57, or greater than 60 (ASTM D2240). The UHMWPE may have a Shore D hardness of less than 100, or less than 90, or less than 80, or less than 75.

The UHMWPE may have a melting point (ASTM D3418) of greater than 100 C, or greater than 110° C., or greater than 115° C., or greater than 120° C., or greater than 125° C., or greater than 130° C. The UHMWPE may have a melting point of less than 200° C., or less than 190° C., or less than 180° C., or less than 170° C., or less than 160° C., or less than 150° C., or less than 140° C.

In some embodiments, the UHMWPE may be in a powder or pellet form. The UHMWPE may have an average particle diameter of less than 75 μm, or less than 70 μm, or less than 65 μm. The UHMWPE may have an average particle diameter of greater than 10 μm, or greater than 15 μm, or greater than 20 μm, or greater than 25 μm. In some embodiments, the UHMWPE may have an average particle diameter of from 40 to 75 μm, or from 50 to 70μ, or from 55 to 65 μm. In some embodiments, the UHMWPE may have an average particle diameter of from 10 to 50 μm, or from 15 to 45 μm, or from 20 to 40 μm, or from 25 to 30 μm.

In some embodiments, the UHMWPE may be part of a masterbatch.

The UHMWPE may be present in the thermoplastic elastomer composition in an amount greater than 5 wt %, or greater than 7 wt %, or greater than 9 wt %, or greater than 10 wt %, or greater than 12 wt %. The UHMWPE may be present in the thermoplastic elastomer composition in an amount of less than 40 wt %, or less than 35 wt %, or less than 30 wt %, or less than 25 wt %, or less than 20 wt %, or less than 15 wt %, or less than 12 wt %. In some embodiments, the UHMWPE is present in the thermoplastic elastomer composition in an amount of from 5 to 40 wt %, or from 5 to 30 wt %, or from 7 to 15 wt %.

Polymer Additives

The thermoplastic elastomer composition may also comprise one or more polymer additives. In preferred embodiments, the thermoplastic elastomer composition comprises a thermoplastic resin (in addition to the thermoplastic resin component of the thermoplastic vulcanizate) and high density polyethylene.

The thermoplastic resin may be any of the thermoplastic resins described with reference to the thermoplastic vulcanizate. Preferably, the thermoplastic resin is a polypropylene. The thermoplastic resin may have a melt flow rate (MFR) from a low of about 5, 10, or 15 g/10 min to a high of about 20, 25, or 30 g/10 min, where desirable ranges may include ranges from any lower limit to any upper limit. The thermoplastic resin may be present in the thermoplastic elastomer composition in an amount of from 5 to 25 wt %, or from 10 to 20 wt %, or from 12 to 17 wt %.

The thermoplastic elastomer composition preferably comprises a high density polyethylene ("HDPE"). In some embodiments, the HDPE is a homopolymer of ethylene. In other embodiments, the HDPE is a copolymer of ethylene and an α-olefin such as 1-butene, 1-pentene, 1-hexene, 1-octene, 1-decene, 1-dodecene, 4-methyl-1-pentene, or 3-methyl-1-pentene.

Preferably the HDPE has a density of greater than 0.93 g/cc, or greater than 0.94 g/cc, or greater than 0.95 g/cc. In some embodiments, the HDPE may have a density of less than 0.99 g/cc, or less than 0.98 g/cc, or less than 0.97 g/cc.

The HDPE may have a melt index (ASTM D1238, 190° C.; 2.16 kg) of less than 2 g/10 min, or less than 1 g/10 min, or less than 0.75 g/10 min, or less than 0.5 g/10 min, or less than 0.2 g/10 min, or less than 0.1 g/10 min. For example, the HDPE may have a melt index greater than 0.01 g/10 min, or greater than 0.02 g/10 min, or greater than 0.03 g/10 min.

The HDPE may have a high load melt index (ASTM D1238; 190° C., 21.6 kg) of greater than 1 g/10 min, or greater than 3 g/10 min, or greater than 5 g/10 min, or greater than 10 g/10 min. For example, the HDPE may have a high load melt index of less than 30 g/10 min, or less than 25 g/10 min, or less than 20 g/10 min, or less than 15 g/10 min.

The HDPE may be present in the thermoplastic elastomer composition in an amount of greater than 5 wt %, or greater than 7 wt %, or greater than 8 wt %, or greater than 9 wt %, or greater than 10 wt %, based on the weight of the thermoplastic elastomer composition. The HDPE may be present in the thermoplastic elastomer composition in an amount of less than 25 wt %, or less than 23 wt %, or less than 22 wt %, or less than 21 wt %, or less than 20 wt %, or less than 19 wt %, or less than 18 wt %, or less than 17 wt %. In some embodiments, the HDPE is present in the thermoplastic elastomer composition in an amount of from 5 to 25 wt %, or from 5 to 20 wt %, or from 10 to 17 wt %.

Additional Additives

The thermoplastic elastomer composition may also comprise one or more additives. The additives may be any of the additives described above with reference to the thermoplastic vulcanizate.

Suitable fillers or additives may include calcium silicate, clay, kaolin, talc, silica, diatomaceous earth, powdered mica, barium sulfate, aluminum sulfate, calcium sulfate, basic magnesium carbonate, glass fibers, and carbon fibers, provided the filler is used in an amount small enough not to adversely affect either the hardness or the coefficients of friction of the thermoplastic elastomer composition. Preferred silicas which may be used are micronized silica, fumed silica, a dry process white carbon referred to as "white carbon", a wet-process white carbon, and synthetic silicate-type white carbon. Silica increases the Taber abrasion of the elastomer but improves its sliding and wear properties, that is, lowers coefficients of friction. Preferably the silica or any other filler is used in an amount small enough not to adversely affect either the hardness or the coefficients of friction, no more than 10 parts, preferably 0.5 to 5 to parts per 100 parts of thermoplastic elastomer composition.

In some embodiments, the thermoplastic elastomer composition further comprises a silicone oil. For example the thermoplastic elastomer composition may comprise less than 5 wt %, or less than 4 wt %, or less than 3 wt %, or from 1-5 wt %, or from 1-4 wt %, or from 1-3 wt % of silicone oil. In some embodiments, the thermoplastic elastomer composition is essentially free of additional silicone oil (other than that which may be contained in the thermoplastic vulcanizate). Embodiments where the thermoplastic elastomer composition contains only a small amount (e.g., less than 3 wt %) or is essentially free of the silicone oil may be preferred, as the silicone oil can bloom to the surface of the laminate.

Examples of silicone oils that may be employed include dimethylsilicone oil, phenylmethylsilicone oil, fluorosilicone oil, tetramethyltetraphenyltrisiloxane and modified silicone oil. Of these, dimethylsilicone oil and phenylmethylsilicone oil are preferred. The kinematic viscosity, measured at 25° C. in accordance with Japanese Industrial Standard K 2283, of the above silicone oil (e) ranges from 10 to 30,000 cSt, preferably, from 50 to 10,000 cSt and, still preferably, from 100 to 5,000 cSt.

Useful organopolysiloxanes are dimethyl polysiloxane, methylphenyl polysiloxane, methylhydrogen polysiloxane and modified polysiloxanes such as epoxy-modified, alkyl-modified, amino-modified, carboxyl-modified, alcohol-modified, fluorine-modified, alkylarylkyl polyether-modified, epoxy polyether-modified, and polyether-modified polysiloxanes.

Thermoplastic Elastomer Compositions

The thermoplastic elastomer compositions described herein comprise a thermoplastic vulcanizate and one or more ultrahigh molecular weight polyethylenes.

The compositions may be prepared by first forming a thermoplastic vulcanizate feed stock that includes the rubber, which is at least partially cured, dispersed within the thermoplastic resin. As discussed above, the thermoplastic vulcanizates may be formed by dynamic vulcanization. The UHWMPE, additional polymer additives (e.g., an additional thermoplastic resin and high density polyethylene), as well as other additives, may be subsequently added to the thermoplastic vulcanizate to form the composition. In some embodiments, the UHMWPE is added while the thermoplastic vulcanizate is in its molten state; that is, the thermoplastic vulcanizate is at a temperature sufficient to achieve flow of the thermoplastic resin phase.

In one or more embodiments, the UHMWPE (as well as any other additional additives) are introduced to the thermoplastic vulcanizate during manufacture of the thermoplastic vulcanizate but following sufficient cure of the rubber, which achieves phase inversion of the rubber within the blend. Dynamic vulcanization may begin by including a greater volume fraction of rubber than thermoplastic resin. As such, the thermoplastic resin is present as the discontinuous phase. As dynamic vulcanization proceeds, the viscosity of the rubber increases and phase inversion occurs. In other words, the thermoplastic resin phase becomes continuous. In one embodiment, the rubber becomes a discontinuous phase. In another embodiment, a co-continuous morphology or pseudo co-continuous morphology can be achieved where both the rubber and the thermoplastic resin are continuous phases. In one embodiment, the thermoplastic (e.g., polyethylene) resins are added after about 50%, in other embodiments after 75%, and in other embodiments after about 90% of the curative is consumed. In certain embodiments, the UHMWPE is added after the curative is completely consumed or full cure has been achieved. In certain embodiments, the thermoplastic vulcanizate is maintained in its molten state from the time of dynamic vulcanization until the UHMWPE are added.

In one or more embodiments, the UHMWPE (as well as any other additional additives) are introduced to the thermoplastic vulcanizate after the thermoplastic vulcanizate has been cooled and optionally fabricated (e.g., pelletized) and re-melted. For example, pellets of thermoplastic vulcanizate can be melted and melt blended with the UHMWPE. In certain embodiments, the thermoplastic vulcanizate is first melted, and then the UHMWPE (as well as any other additional additives) are subsequently introduced. In other embodiments, pellets of the thermoplastic vulcanizate and one or more of the UHMWPE are blended (i.e., introduced), and then the mixture is melted and blended.

The thermoplastic elastomer compositions described herein are particularly useful in laminates for use in window channel application, and in particular in the slip coat of a window channel. The laminate includes at least two layers, one layer being the surface layer or slip coat layer, and the other layer being the substrate or base layer. The surface layer comprises the thermoplastic elastomer compositions described herein. FIG. 1 illustrates a typical window channel such as glass run channel. The typical glass run channel contains a base material 103 and a lip material 102. The base material and lip material are covered with the slip coat layer 101 and 104, respectively.

The substrate or base layer may include at least one polymer characterized by having a glass transition temperature ($T_g$) that is lower than ambient temperature, such as less than 0° C., or less than −20° C., or less than about −65° C. In some embodiments, the substrate includes at least one rubbery polymer. In certain embodiments, the substrate may include one or more block copolymers that include a soft or rubbery segment (i.e., a segment having a glass transition temperature that is less than about 0° C.). In other embodiments, these compositions may include blends of rubbery polymers together with thermoplastic polymers.

Useful rubbery polymers include natural or synthetic rubbery polymers. Synthetic rubbery polymers include homopolymers of one or more conjugated dienes and copolymers of conjugated dienes and vinyl aromatics such as styrene. Other useful rubbery copolymers include copolymers of ethylene, propylene, and diene monomers. The copolymers include both random copolymers (e.g., styrene-butadiene rubber) as well as block copolymer (e.g., styrene-butadiene-styrene block copolymers (S-B-S) and the hydrogenated derivatives thereof (S-E/B-S)). In another embodiment, the substrate includes a blend of a poly α-olefin (e.g., polypropylene) and a block copolymer (e.g., S-B-S or S-E/B-S); in particular embodiments, these may include blends of polyolefin with crosslinkable/crosslinked styrenic block copolymers.

In particular embodiments, the substrate includes a thermoplastic vulcanizate, which as described herein generally include blends of cured (either fully or partially) rubber and thermoplastic resins. In one embodiment, the thermoplastic vulcanizate includes cured copolymers of ethylene, propylene, and diene monomers (e.g., EPDM) dispersed within a continuous poly α-olefin (e.g., polypropylene) phase. In some embodiments, the substrate consists essentially of, or consists of, a thermoplastic vulcanizate. In particular embodiments, the substrate may include a thermoplastic vulcanizate characterized by a Shore A hardness greater than 45, or greater than 50, or greater than 55, or greater than 60, or greater than 65, or greater than 70, or greater than 75. In these or other embodiments, the substrate is a thermoplastic vulcanizate characterized by a Shore A hardness less than 100, or less than 95, or less than 90, or less than 85, or less than 80. In some embodiments, the substrate may comprise a thermoplastic vulcanizate that has a compression set (ASTM D395B, 70° C., 22 hr, Type 1) of less than 50%, or less than 45%, or less than 40%, or less than 35%.

Laminates can be prepared by employing a variety of techniques. In one embodiment, the slip-coat compositions of the invention and the substrate are co-extruded to form an integral laminate. In other embodiments, the substrate layer is first prepared by using a variety of techniques including molding or extruding, and then the slip-coat composition is subsequently extruded onto the substrate. In other embodiments, the slip-coat composition and substrate can be separately extruded and then laminated to one another.

The thickness of the slip-coat layer may be from about 50 μm to about 150 μm, or from about 75 μm to about 125 μm, or from about 85 μm to about 115 μm. The thickness of the substrate layer can vary depending on the construction of the laminate or the glass run channel.

In one or more embodiments, slip-coat layers containing the compositions of the invention can be characterized by having numerous advantageous properties including a relatively low coefficient of friction, improved surface appearance, improved wear resistance, improved UV stability, and less susceptibility to stress whitening.

In certain embodiments, the slip-coat layer is advantageously characterized by exhibiting a kinetic coefficient of friction, per ASTM D1894-99 on glass at room temperature, of less than 0.5, or less than 0.4, or less than 0.3, or less than 0.20, or less than 0.19, or less than 0.18.

Likewise, certain embodiments of the slip-coat layer are advantageously characterized by exhibiting a static coefficient of friction per ASTM D1894-99 on glass at room temperature, of less than 0.5, or less than 0.4, or less than 0.3, of less than 0.20, or less than 0.19, or less than 0.18.

Still further, certain embodiments of the slip-coat layer can be advantageously characterized by exhibiting a Shore D hardness of from about 30 to about 55, or from about 35 to about 50, or from about 40 to about 45.

Also, certain embodiments of the slip-coat layer are advantageously characterized by exhibiting an improved surface appearance as demonstrated by relatively low extrusion surface ratings (ESR). ESR can be analyzed as described by Ellul et al., in "Chemical Surface Treatments Of Natural Rubber And EPDM Thermoplastic Elastomers: Effects On Friction And Adhesion," RUBBER CHEMISTRY AND TECHNOLOGY, Vol. 67, No. 4, pg. 582 (1994). Preferably, the slip-coats of certain embodiments of this invention are characterized by having an ESR value (Ra) that is greater than 80, or greater than 90, or greater than 100. In some embodiments, the slip-coats have an ESR value (Ra) that is less than 150, or less than 120, or less than 110.

The slip-coat may have a surface roughness (μm) of less than 10 μm, or less than 9 μm, or less than 8 μm, or less than 7 μm, or less than 6 μm. In some embodiments, the slip-coat may have a surface roughness of from 1 to 6 μm, or from 3 to 6 μm.

The thermoplastic elastomer compositions may desirable have an elongation at break of greater than 100%, or greater than 110%, or greater than 115%, or greater than 120%. An increased elongation at break may indicate that the thermoplastic elastomer composition may exhibit decreased whitening when bended.

The process for making a weatherseal may comprise, (i) melt-blending a first TPV in a first barrel to form a first TPV melt (ii) extruding the first TPV melt under suitable extrusion conditions through a first extrusion die of predetermined cross-section to form the body of the weatherseal; (iii) melt-blending a second TPV, the same as or different from the first, in a second barrel to form a second TPV melt (iv) extruding the second TPV melt under suitable extrusion conditions through a second extrusion die of predetermined cross-section to form a slip-coating (v) contacting the body portion with the slip-coating (vi) and recovering a weatherseal having its body integrally bonded to the slip-coating, the weatherseal having the desired cross-section and the slip-coating presenting the desired surface-abutting surface.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Test Methods

The LCR capillary viscosity was measured according to ASTM D3835 at a shear rate of 1200 sec$^{-1}$ and 240° C. using a die with a 1 mm diameter, 30 mm length, 180° entry angle die. The LCR viscosity is reported in Pa·s.

Extrusion surface roughness ("ESR") in was measured as follows: approximately 1 kg (2 lbs.) of the TPV to be tested was fed into a 1" or 1½" diameter extruder equipped with a 24:1 L/D screw having a 3.0 to 3.5 compression ratio. The extruder was fitted with a strip die 25.4 mm (1") wide×0.5 mm (0.019") thick×7 to 10 mm (0.25 to 0.40") length. A breaker plate was used with the die, but no screen pack was placed in front of the breaker plate. Temperature profiles of the extruder were as follows: Zone 1=180° C. (feed zone); Zone 2=190° C. (feed zone); Zone 3=200° C. (feed zone); Zone 4=205° C. (die zone). When the zone temperatures were reached, the screw was activated. Screw speed was set to maintain an output of approximately 50 grams per minute. For the first 5 minutes of extrusion the extruder was flushed and the extruded material was discarded. A strip approximately 30.5 cm (12") in length was extruded on a flat substrate placed directly under and touching the underside of the die. Three representative samples were collected in this manner ESR was measured on the samples using a model EMD-04000-W5 Surfanalyzer System 4000 including a universal probe 200 mg stylus force and a Surfanalyzer proper tip type EPT-01049 (0.025 mm (0.0001") stylus radius).

The specific gravity ("SG") was measured according to ASTM D792.

Shore D hardness was measured using ISO 868.

The density of the thermoplastic elastomer composition was measured using ISO 1183-1, Method A.

Ultimate tensile strength ("UTS"), modulus at 100% extension ("M100" or "100% Modulus"), and ultimate elongation ("UE") were measured on injection molded plaques according to ISO 37, Type 1, at 23° C. (unless otherwise specified) at 500 mm per minute, perpendicular.

In the examples, the Surface roughness (Ra) and roughness index (Ri) of the laminate was measured on the laminate samples using a model EMD-04000-W5 Surfanalyzer System 4000 including a universal probe 200 mg stylus force and a Surfanalyzer proper tip type EPT-01049 (0.025 mm (0.0001")) stylus radius.

Figure 2:
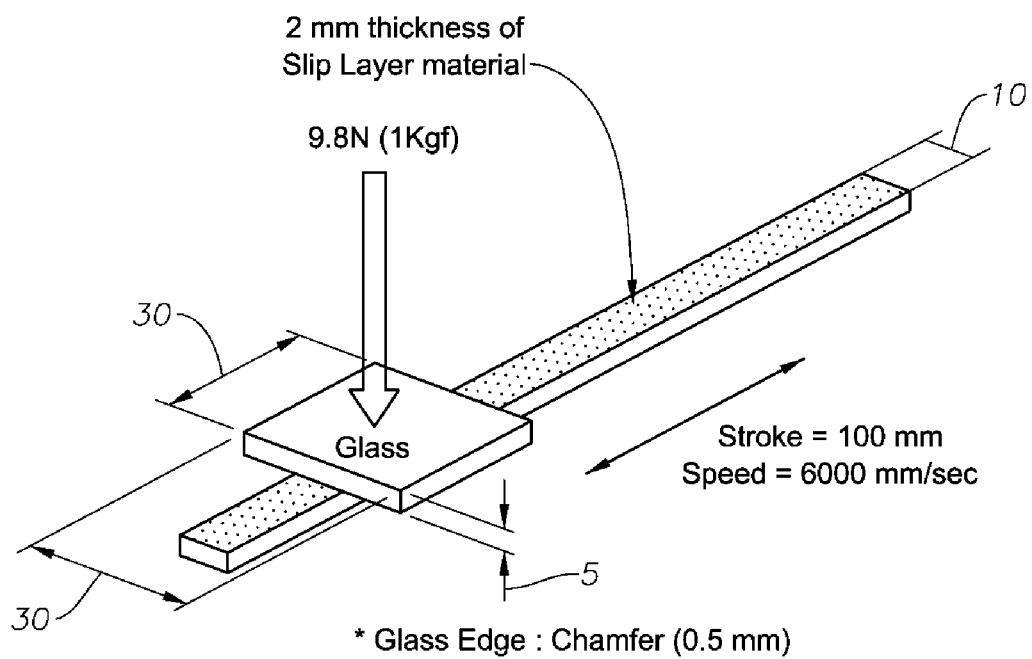
FIG. 2 illustrates the test method for measuring the coefficient of friction ("COF") of a specimen at dry conditions.

The static and kinetic coefficient of frictions of laminates made with the thermoplastic elastomer composition can be measured per ASTM D1894-99 on glass. FIG. 2 illustrates the method to test the coefficient of frictions of the coextruded laminates at dry conditions where the glass test block is slid across the slip coat layer of the laminate.

Figure 3:
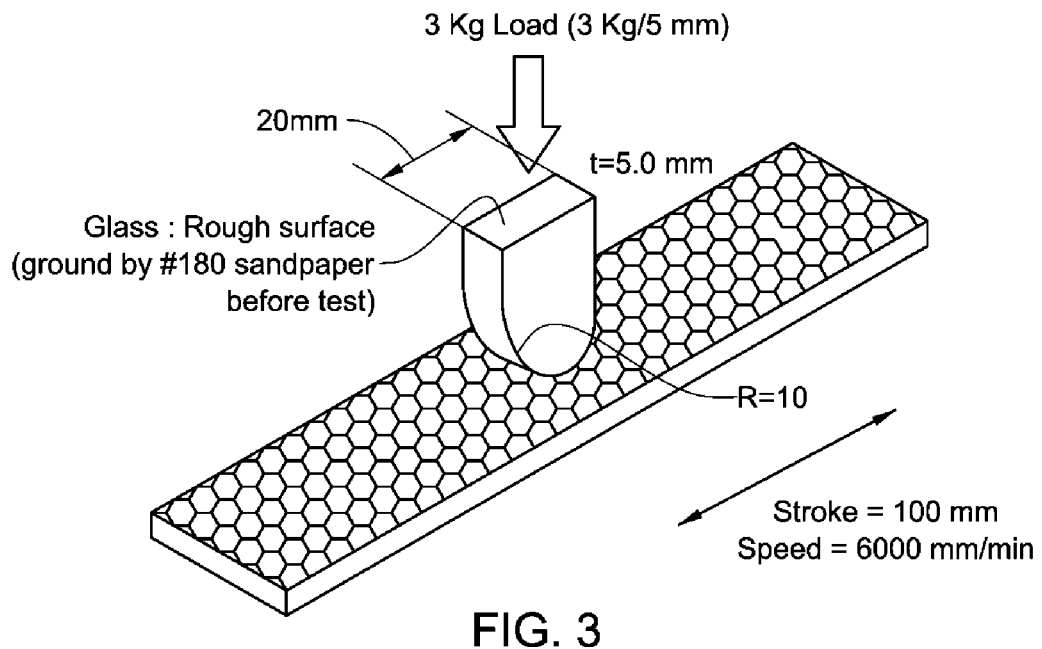
FIG. 3 illustrates the test method for measuring the sliding force at wet conditions.

The sliding force of laminates made with the thermoplastic elastomer composition can be measured with reference to FIG. 3. As shown in FIG. 3, a glass test block is slid across the slip coat layer of the laminate at a stroke distance of 100 mm and a speed of 6000 mm/min. The force required to slide the test block is recorded for each cycle.

Figure 4:
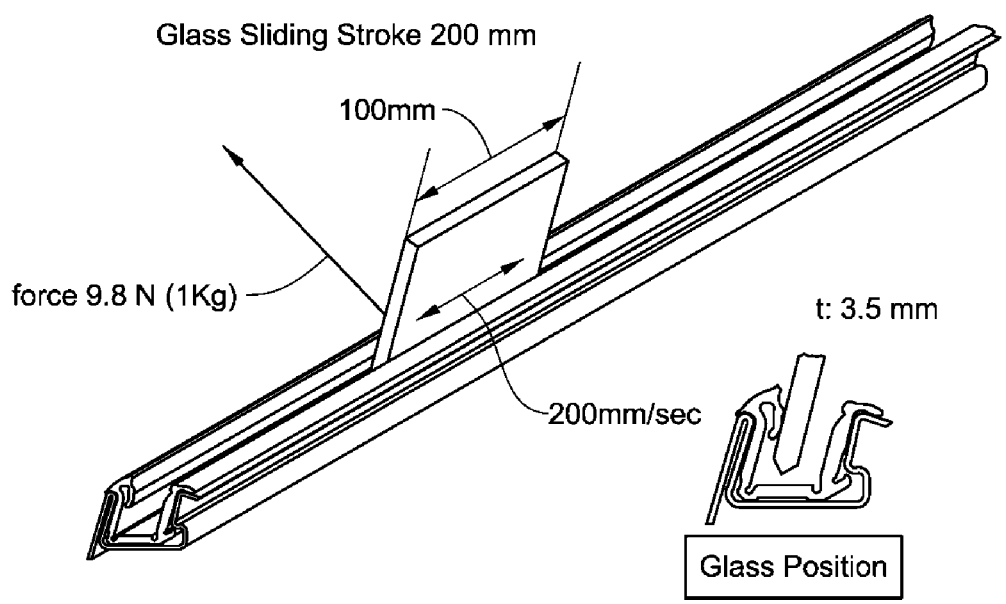
FIG. 4 illustrates the test method for measuring the sliding force of a glass run channel at wet conditions.

Sliding performance of the glass run channel profile can be measured with reference to FIG. 4. As seen in FIG. 4, the glass test block is slid back-and-forth against the slip coat layer in the glass run channel at a stroke distance of 200 mm and a speed of 200 mm/sec.

The bonding (180° bending) test was conducted with reference to FIG. 5. A half dumbbell of JIS NO. 2 dumbbell of the co-extruded laminates was inserted, and Santoprene™ 121-79W233 thermoplastic vulcanizate was injected to complete the other half of the dumbbell at an injection speed of 50 mm/s, 38 bar pressure, with 12 bar holding pressure, mold temperature of 60° C. The injection time and holding time was 5 seconds, followed by 40 seconds of cooling time. The full dumbbell was then bent by hand as shown in FIG. 5. The 90° bending test was also conducted using a JIS NO. 2 dumbbell as described above, however, the dumbbell was bent by hand to 90° (instead of 180°) where the presence of cracks and splits were visually observed.

In the examples, the tear strength was measured according to ASTM D1922.

Ingredients

In the examples, the base thermoplastic vulcanizate used to make the thermoplastic elastomer compositions was a thermoplastic vulcanizate ("TPV1") with a density of 0.960 g/cc and a Shore D hardness of 41 (ISO 868; 15 sec, 23° C., 2.00 mm). TPV1 was prepared by dynamically mixing and vulcanizing in a twin-screw extruder the formulation described in Table 1, where the formulation is shown in parts per 100 parts of rubber ("phr"). The polypropylene, granulated EPDM rubber, clay, zinc oxide, $SnCl_2$ masterbatch, and carbon black masterbatch were added to the extruder at the feed throat. The phenolic resin-in-oil was injected into the extruder after the feed throat and initial mixing zone. A first portion of free process oil ("pre-cure oil") was introduced to the extruder after the feed throat but before the phenolic resin-in-oil injection point and a second portion of free process oil ("post-cure oil") was introduced to the extruder after the phenolic resin-in-oil injection point.

TABLE 1

TPV1 Formulation

| Raw Materials | Amount (phr) |
| --- | --- |
| ExxonMobil ™ PP 5341 | 205.43 |
| Vistalon ™ V3666 EPDM | 175.00 |
| Sunpar ™ 150 Oil (pre-cure) | 7.79 |
| Sunpar ™ 150 Oil (post-cure) | 40.68 |
| Phenolic Resin-in-Oil | 14.00 |
| Zinc Oxide | 2.00 |
| Icecap ™ K Clay | 42.00 |
| Carbon Black Masterbatch | 36.60 |
| $SnCl_2$ Masterbatch | 2.22 |
| Total (phr) | 525.72 |

V3666 was Vistalon™ 3666 EPDM rubber which is commercially available from ExxonMobil Chemical Company, Houston, Tex. V3666 is oil-extended with 75 phr of oil. V3666 has a Mooney Viscosity of 52 MU (ML 1+4, 125° C.; ASTM D1646) and contains 64.0 wt % ethylene-derived units (ASTM D3900) and 4.5 wt % ENB diene-derived units (ASTM D6047), with the remainder being propylene-derived units.

PP5341 was ExxonMobil™ PP5341 polypropylene which is a polypropylene homopolymer commercially available from ExxonMobil Chemical Company, Houston, Tex. PP5341 has a density of 0.9 g/cc and a MFR of 0.83 g/10 min (ASTM D1238; 230° C. and 2.16 kg weight).

The phenolic resin-in-oil used to make TPV1 was a phenolic resin-in-oil curative that contained 30 wt % phenolic resin and 70 wt % oil.

The carbon black masterbatch used to make TPV1 was a carbon black masterbatch that contained 57.75 wt % polypropylene homopolymer having an MFR of 35 g/10 min (ASTM D1238; 230° C. and 2.16 kg weight), 41.1 wt % carbon black, 1 wt % Kenamide S, and 0.25 wt % primary antioxidant.

The stannous chloride masterbatch used to make TPV1 was an anhydrous stannous chloride polypropylene masterbatch that contained 55 wt % of polypropylene having an MFR of 0.8 g/10 min (ASTM D1238; 230° C. and 2.16 kg weight) and 45 wt % stannous chloride.

F180A PP was Braskem F180A which is commercially available polypropylene from Braskem. F180A has a MFR of 17 g/10 min (ASTM D1238; 230° C. and 2.16 kg weight).

HDPE 7960.13 was ExxonMobil HDPE 7960.13 which is commercially available high density polyethylene from ExxonMobil Chemical Company, Houston, Tex. HDPE 7960.13 has a density of 0.952 g/cc, a melt index of 0.06 g/10 min (ASTM D1238; 190° C. and 2.16 kg), and a high load melt index of 10 g/10 min (ASTM D1238; 190° C. and 21.6 kg).

The siloxane masterbatch SiMB 50-314 used was Dow Corning SiMB 50-314 which is commercially available from Dow Corning. The masterbatch is a masterbatch of 50 wt % ultra-high molecular weight functionalized siloxane dispersed in high density polyethylene.

The silicone oil used in the examples was PMX200 silicone oil that is commercially available from Dow Corning. The silicone oil had a viscosity of 1000 cSt and a specific gravity at 25° C. of 0.970.

Mipelon XM-220 is a fine particle ultrahigh molecular weight polyethylene powder that is commercially available from Mitsui Chemical. XM-220 has a smooth spherical shape, a density of 0.940 g/cc, a bulk specific gravity of 0.400 g/cc (ASTM D1895), a molecular weight of $200 \times 10^4$ g/mol, a Shore D hardness of 65 (ASTM D2240), a melting point of 136° C. (ASTM D3418). XM-220 has an average particle size of 30 μm as measured by the Coulter counter method. XM-220 has a particle size distribution such 10% of the particles have a size of less than about 20 μm, 35% of the particles have a size of from 20-30 μm, 35% of the particles have a size of 30-40 μm, and 20% of the particles have a size of greater than 40 μm.

Mipelon XM-330 is a fine particle ultrahigh molecular weight polyethylene powder that is commercially available from Mitsui Chemical. XM-330 has an average particle size of 60 μm.

Ticona GUR 4170 is a linear ultrahigh molecular weight polyethylene resin in powder form available from Celanese. GUR 4170 comes in a powder form and has a density of 0.930 g/cc (ISO 1183), a Shore D hardness of 60 (ISO 868, 15 sec. value), and a Vicat softening temperature of 80° C. (ISO 306; 50° C./h, 50 N). GUR 4170 has a bulk density (DIN 53 466) greater than 0.4 g/cc and a molecular weight of approximately $10.5 \times 10^6$ g/mol (calculated using Margolies' equation: $M=5.37 \times 104(\eta)^{1.49}$, where η is in dl/g).

Ticona GUR 4150-3 is a linear ultrahigh molecular weight polyethylene available from Celanese. GUR 4150 comes in powder form and has a density of 0.930 g/cc (ISO 1183), a Shore D hardness (15 sec, ISO 868) of 61, and a Vicat softening temperature of 80° C. (ISO 306, 50° C./h 50 N). GUR 4150 has a bulk density (DIN 53 466) greater than 0.4 g/cc and a molecular weight of approximately $9.2 \times 10^6$ g/mol (calculated using Margolies' equation: $M=5.37 \times 104(\eta)^{1.49}$, where η is in dl/g). GUR 4150 has an average particle size of about 60 μm.

UTEC3040 is a ultra high molecular weight polyethylene available from Braskem. UTEC3040 has a molecular weight of $3.0 \times 10^6$ g/mol, a density of 0.925 g/cc (ASTM D792), a bulk density of 0.45 g/cc (ASTM D1895), an average particle size (D50) as measured by screen analysis ASTM D1921 of 190 μm or as measured by laser scattering (ISO 13320-1) of 230 μm, a Shore D hardness of 57 (ASTM D 2240, 15 s), a melt temperature of 133° C. (ASTM D3418), and a Vicat softening temperature of 128° C. (ASTM D1525).

Lubmer 5000 is an ultrahigh molecular weight polyethylene available from Mitsui Chemical. Lubmer 5000 has a melt flow rate (ASTM D1234, 190° C., 10 kg) of 2 g/10 min, a density of 0.966 g/cc, and a Vicat softening point (ASTM D1525, 1 kg) of 130° C. Lubmer 5000 has a molecular weight of 950,000 g/mol.

Lubmer 5220 is a lubricant-filled ultrahigh molecular weight polyethylene available from Mitsui Chemical. Lubmer 5220 has a melt flow rate (ASTM D1234, 190° C., 10 kg) of 2 g/10 min, a density of 0.964 g/cc, and a Vicat softening point (ASTM D1525, 1 kg) of 130° C.

Kenamide Ultra E is an erucamide slip agent.

Hi-Sil 233 is silica filler available from PPG Industries, Inc. Hi-Sil 223 comes in powder form and has a surface area of about 150 $m^2/g$ (BET-5).

Santoprene™ 121-67W175 is a black thermoplastic vulcanizate commercially available from ExxonMobil Chemical Company. Santoprene™ 121-67W175 TPV has a specific gravity of 0.970 (ASTM D792), a density of 0.970 g/cc (ISO 1183), a Shore A hardness of 72 (ISO 868, 15 sec, 23° C., 2.00 mm), a compression set (ASTM D395B, 70° C., 22 hr, Type 1) of 30%, and a brittleness temperature of −60° C. (ASTM D746).

Santoprene™ 121-73W175 is a black thermoplastic vulcanizate commercially available from ExxonMobil Chemical Company. Santoprene™ 121-73W175 TPV has a specific gravity of 0.970 (ASTM D792), a density of 0.970 g/cc (ISO 1183), a Shore A hardness of 78 (ISO 868, 15 sec, 23° C., 2.00 mm), a compression set (ASTM D395B, 70° C., 22 hr, Type 1) of 33%, and a brittleness temperature of −60° C. (ASTM D746).

Example 1

Example 1 was conducted to evaluate the effect that the use of three different UHMWPEs had on the resulting thermoplastic elastomer composition. The thermoplastic elastomer compositions were made by mixing in a twin-screw extruder the formulations described in Tables 2 and 3, where the formulation is shown in weight percent based on the weight of the thermoplastic elastomer composition. The twin-screw extruder had 15 barrel sections, and the barrel section at which each ingredient was introduced to the twin-screw extruder is shown in Tables 2 and 3. In samples F01, F02, F03, and F05 the UHMWPE was introduced to the extruder at the feed throat. In samples F06, F07, F08, and F09 the UHMWPE was introduced to the extruder through a side feeder after the initial mixing zone. The extruder screw mixing speed (in revolutions per minute, "RPM") used and the mesh size of the melt screen at the exit of the extruder is also indicated in Tables 2 and 3. The mesh size indicates the number of wires in the mesh per inch of screen. Thus, a mesh size of 100, indicates that there were 100 wires per inch of the screen. As the formulations exited the twin-screw extruder they were pelletized using an underwater pelletizer to form pelletized thermoplastic elastomer compositions.

TABLE 2

Example 1 Formulations

| | Barrel Section # | F01 | F02 | F03 | F05 |
|---|---|---|---|---|---|
| TPV1 | 1 | 47.1 | 47.1 | 47.1 | 46.6 |
| F180A PP | 1 | 16.0 | 16.0 | 16.0 | 15.8 |
| HDPE 7960.13 | 1 | 12.0 | 12.0 | 12.0 | 11.9 |
| SiMB 50-314 | 1 | 9.9 | 9.9 | 9.9 | 9.8 |

TABLE 2-continued

Example 1 Formulations

| | Barrel Section # | F01 | F02 | F03 | F05 |
|---|---|---|---|---|---|
| Kenamide Ultra E | 8 | 2.0 | 2.0 | 2.0 | 2.0 |
| Mipelon XM-220 | 1 | 13.0 | — | — | — |
| GUR 4170 | 1 | — | — | 13.0 | 12.9 |
| UTEC 3040 | 1 | — | 13.0 | — | — |
| PMX200 Silicone Oil | 8 | — | — | — | 1.0 |
| Total (wt %) | — | 100% | 100% | 100% | 100% |

TABLE 2-continued

Example 1 Formulations

| | Barrel Section # | F01 | F02 | F03 | F05 |
|---|---|---|---|---|---|
| Mixing Speed, RPM | — | 225 | 225 | 225 | 225 |
| Melt Screen Mesh Size | — | 100 | 100 | 100 | 100 |

TABLE 3

Example 1 Formulations Continued

| | Barrel Section # | F06 | F07 | F08 | F09 |
|---|---|---|---|---|---|
| TPV1 | 1 | 46.6 | 47.1 | 47.1 | 47.1 |
| F180A PP | 1 | 15.8 | 16.0 | 16.0 | 16.0 |
| HDPE 7960.13 | 1 | 11.9 | 12.0 | 12.0 | 12.0 |
| SiMB 50-314 | 1 | 9.8 | 9.9 | 9.9 | 9.9 |
| Kenamide Ultra E | 8 | 2.0 | 2.0 | 2.0 | 2.0 |
| Mipelon XM-220 | 10 | | | | 13.0 |
| GUR 4170 | 10 | | 12.9 | 13.0 | |
| UTEC 3040 | 10 | | | 13.0 | |
| PMX200 Silicone Oil | 8 | 1.0 | | | |
| Total (wt %) | — | 100% | 100% | 100% | 100% |
| Mixing Speed, RPM | — | 255 | 255 | 255 | 255 |
| Melt Screen Mesh Size | — | 100 | 100 | 100 | 100 |

Injection molded plaques of the thermoplastic elastomer compositions were made. The LCR viscosity, ESR, specific gravity, Shore D hardness, density, ultimate tensile strength, and ultimate elongation, and 100% Modulus of the plaques were measured with the results shown in Table 4.

Coextruded laminates were formed with the thermoplastic elastomer compositions. The laminate was about 2 mm thick, with each layer (i.e., the slip coat layer containing the thermoplastic elastomer composition and the substrate layer) being about 1 mm thick. The substrate layer was made from Santoprene™ 121-67W175 or Santoprene™ 121-73W175 thermoplastic vulcanizate, which is commercially available from ExxonMobil Chemical Co. The surface roughness, static COF, kinetic COF, and roughness index of the coextrusion laminate samples were tested for a variety of parameters with the results shown in Table 4. The coextrusion laminate samples were also visually inspected for a visual indication of the smoothness and the appearance of surface spots and blemishes, with the results shown in Table 4.

TABLE 4

Example 1 Extrusion Tape Sample Properties

| Property | Units | F01 | F02 | F03 | F05 | F06 | F07 | F08 | F09 |
|---|---|---|---|---|---|---|---|---|---|
| LCR | Pa * s | 108.83 | 105.27 | 105.42 | 102.01 | 99.43 | 104.56 | 100.94 | 110.62 |
| ESR | Ra | 87 | 134 | 191 | 187 | 215 | 216 | 224 | 129 |
| SG | — | 0.9367 | 0.9418 | 0.9387 | 0.9397 | 0.9414 | 0.9417 | 0.9415 | 0.9423 |
| Shore D Hardness | — | 47.6 | 47.3 | 47.4 | 46.7 | 46.8 | 47.1 | 47.0 | 47.2 |
| Density | g/cc | 0.9367 | 0.9418 | 0.9387 | 0.9397 | 0.9414 | 0.9417 | 0.9415 | 0.9423 |
| UTS | MPa | 12.7 | 12.68 | 12.77 | 12.72 | 12.7 | 12.41 | 12.76 | 12.89 |
| UE | % | 103 | 43 | 57 | 59 | 64 | 60 | 45 | 114 |
| 100% Modulus | MPa | 13 | NA | NA | NA | NA | NA | NA | 13 |
| Surface Roughness | | 5.6 | 11.1 | 9.3 | 8.9 | 11.4 | 12.1 | 12.3 | 4.7 |
| Static COF | | 0.22 | 0.26 | 0.29 | 0.26 | 0.26 | 0.27 | 0.27 | 0.34 |
| Kinetic COF | | 0.22 | 0.17 | 0.12 | 0.1 | 0.2 | 0.13 | 0.13 | 0.27 |
| Roughness Index (Ri) | | 5.6 | 11.1 | 9.3 | 8.9 | 11.4 | 12.1 | 12.3 | 4.7 |
| Visual Aspect | — | Smooth base with blemishes. | Rough | Rough | Rough | Rough | Rough | Rough | Smooth base with blemishes |

As seen in Table 4, the extrusion tapes made using the formulations that contained the larger particle sized UHMWPE, GUR4170 and UTEC3040, had increased surface roughness and the extrusion tapes made using the formulations that contained the smaller particle sized UHMWPE (XM-220) had decreased surface roughness. This was visually verified, as seen in FIG. 6 which shows photographs of the extrusion tapes made with samples F01 and F02. As seen in FIG. 6, the tape made with F01 had a smoother surface but still showed blemishes and spots while the tape made with F02 had a uniformly rough surface.

Figure 7A:
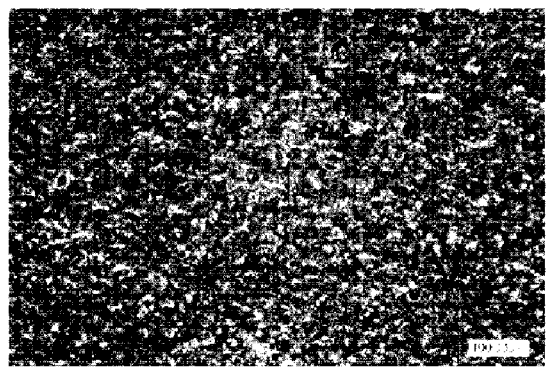
FIG. 7 is microscopy images of the extrusion tapes made with samples F01 and F09 in Example 1.
Figure 7B:
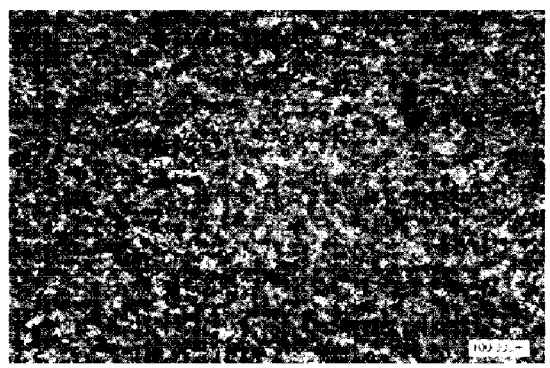
Figure 7C:
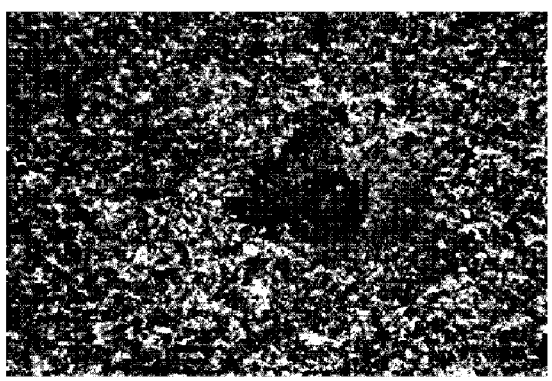

Microscopy images of the extrusion tapes made with samples F01 and F09 are shown in FIG. 7, with 7a being a microscopy image of sample F01, with 7b being a microscopy image of sample F09, and with 7c being a close-up of the microscopy of sample F09. As seen in FIG. 7b the extrusion tape made with sample F09 where the UHMWPE was added through a side feeder had a slightly smoother appearance, than the extrusion tape in FIG. 7a made with sample F01 where the UHMWPE was added to the feed through. However, as seen in FIG. 7c there were still surface occlusions in the extrusion tape sample made with F09 where there were undistributed agglomerations of the UHMWPE.

Example 2

Example 2 was conducted to evaluate the effect of using higher shearing (higher mixing speed) to make the thermoplastic elastomer compositions and to evaluate the effect of using different amounts of the ultra-high molecular weight polyethylene. The thermoplastic elastomer compositions made in Example 2 had the formulations listed in Table 5, where the formulations are shown in weight percent based on the weight of the thermoplastic elastomer composition. The thermoplastic elastomer compositions were made by mixing the ingredients in a twin-screw extruder that had 15 barrel sections. The barrel section at which each ingredient was introduced to the twin-screw extruder is shown in Table 5, along with the extruder screw mixing speed (in revolutions per minute, "RPM") used and the mesh size of the melt screen at the exit of the extruder. As the formulations exited the twin-screw extruder they were pelletized using an underwater pelletizer to form pelletized thermoplastic elastomer compositions.

TABLE 5

Example 2 Formulations

| | Barrel Section # | G01 | G02 | G03 | G04 | G05 | G06 | G07 |
|---|---|---|---|---|---|---|---|---|
| TPV1 | 1 | 47.1 | 47.1 | 47.1 | 47.1 | 47.1 | 47.1 | 47.1 |
| F180A PP | 1 | 16.0 | 16.0 | 16.0 | 16.0 | 16.0 | 16.0 | 16.0 |
| HDPE 7960.13 | 1 | 25.0 | 12.0 | 18.50 | 12.0 | 12.0 | 18.50 | 18.50 |
| SiMB 50-314 | 1 | 9.9 | 9.9 | 9.9 | 9.9 | 9.9 | 9.9 | 9.9 |
| Kenamide Ultra E | 8 | 2.0 | 2.0 | 2.0 | 2.0 | 2.0 | 2.0 | 2.0 |
| Mipelon XM-220 | 10 | — | — | — | — | 13.0 | 6.5 | — |
| GUR 4170 | 10 | — | — | — | 13.0 | — | — | 6.5 |
| UTEC 3040 | 10 | — | 13.0 | 6.5 | — | — | — | — |
| Total (wt %) | — | 100% | 100% | 100% | 100% | 100% | 100% | 100% |
| Mixing Speed, RPM | — | 350 | 350 | 350 | 350 | 350 | 350 | 350 |
| Melt Screen Mesh Size | — | 100 | 100 | 100 | 100 | 100 | 100 | 100 |

Injection molded plaques of the thermoplastic elastomer compositions in Table 5 were made. The LCR viscosity, ESR, specific gravity, Shore D hardness, ultimate tensile strength, and ultimate elongation, and 100% Modulus of the plaques were measured with the results shown in Table 6.

Coextrusion laminate samples were made using samples of the formulations in Table 5 as described in Example 1. The surface roughness, static COF, kinetic COF, tear strength, and roughness index of the coextrusion tape samples were tested and the laminates were visually inspected for a visual indication of the smoothness and the appearance of surface spots and blemishes with the results shown in Table 6.

As seen in Table 6, the extrusion tape samples made using the formulations containing lesser amounts of the UHMWPE had decreased extrusion surface roughness.

Figure 8A:
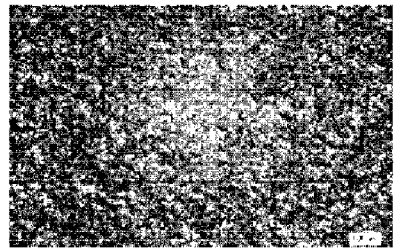
FIG. 8 is microscopy images of the extrusion tapes made with samples G01, G02, G04, G05, and G06 in Example 2.
Figure 8B:
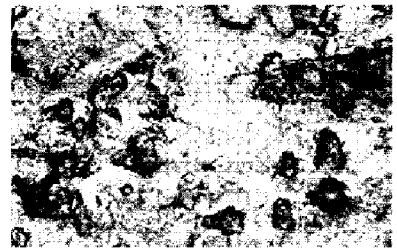
Figure 8C:
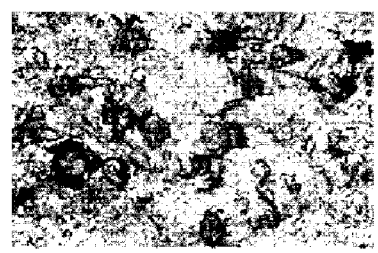
Figure 8D:
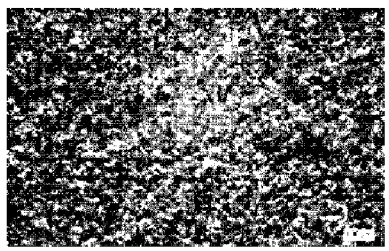
Figure 8E:
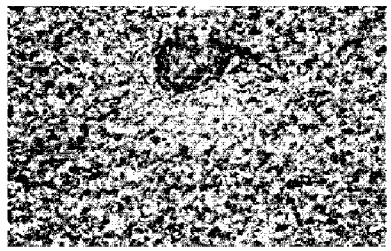
Figure 8F:
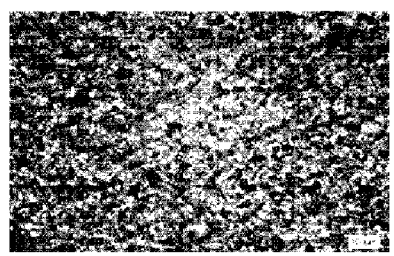
Figure 8G:
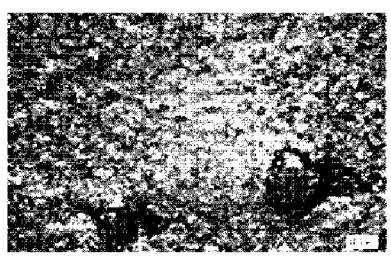

FIG. 8 provides microscopy images of extrusion tapes made with samples G01 (FIG. 8a), G02 (FIG. 8b), G04 (FIG. 8c), G05 (FIGS. 8d and 8e), and G06 (FIGS. 8f and 8g). By comparing FIGS. 8d and 8f it is seen that the extrusion tape sample made with less UHMWPE (Sample G06 with 6.5 wt % vs. Sample G05 with 13 wt %) exhibited a lower concentration of surface spots. However, as seen in the close-up microscopy images in FIGS. 8e and 8g, both still exhibited surface occlusions due to undistributed UHMWPE particles.

A comparison of the surface roughness and kinetic CoF of the extrusion tape samples made in Example 1 and Example 2 can be made. As seen in the tables, samples G305, G306, F309, and F301 had the best balance of surface roughness and kinetic CoF, as they exhibited 5 microns or less of surface roughness and had suitable kinetic CoF.

Example 3

Example 3 was conducted to evaluate the effect of using a finer mesh screen pack. In Example 3 the thermoplastic elastomer compositions were made by mixing in a twin-

TABLE 6

Example 2 Extrusion Tape Sample Properties

| Property | Units | G01 | G02 | G03 | G04 | G05 | G06 | G07 |
|---|---|---|---|---|---|---|---|---|
| LCR | Pa * s | 0.0952 | 0.001 | 0.0011 | 0.0022 | 0.004 | 0.0014 | 0.0045 |
| ESR | Ra | 94.92 | 98.26 | 96.54 | 98.76 | 102.69 | 99.74 | 94.58 |
| SG | — | 51.2 | 194 | 164 | 179 | 81.2 | 92.6 | 223 |
| Shore D Hardness | — | 0.944 | 0.9475 | 0.9487 | 0.9468 | 0.9488 | 0.9485 | 0.9471 |
| UTS | MPa | 46.8 | 47.5 | 47.3 | 47.3 | 47.1 | 47.3 | 47.2 |
| 100% Modulus | MPa | 14.25 | 13.9 | 14.1 | 14.35 | 13.45 | 13.7 | 13.55 |
| UE | % | 13.1 | NA | NA | NA | NA | 12.85 | NA |
| Surface Roughness | | 450 | 60 | 60 | 40 | 90 | 100 | 70 |
| Static COF (1 kg, 2000 mm/min) | | 2.8 | 12.8 | 10.1 | 10.6 | 3.9 | 3.9 | 12.2 |
| Kinetic COF | | 0.46 | 0.32 | 0.27 | 0.28 | 0.3 | 0.35 | 0.29 |
| Tear Strength (20 in/min) | kN/m | 77.8 | 55 | 62.3 | 58 | 56.4 | 59.5 | 63.7 |
| Roughness Index (Ri) | | 2.8 | 12.8 | 10.1 | 10.6 | 3.9 | 3.9 | 12.2 |
| Visual Aspect | — | Smooth | Rough | Rough | Rough | Smooth with micro blemishes | Smooth with few blemishes | Rough | screw extruder the formulations described in Tables 7 and 8, where the formulation is shown in parts per 100 parts of rubber ("phr"). The screw design used in Example 3 had more distributive elements as compared to the screw that was used in Examples 1 and 2. The twin-screw extruder had 15 barrel sections, and the barrel section at which each ingredient was introduced to the twin-screw extruder is shown in Table 7, along with the extruder screw mixing speed (in revolutions per minute, "RPM") used and the mesh size of the melt screen at the exit of the extruder. As the formulations exited the twin-screw extruder they were pelletized using an underwater pelletizer with a water temperature of 45-50° C. to form pelletized thermoplastic elastomer compositions.

TABLE 7

Example 3 Formulations

| | Barrel Section # | K01 | K02 | K03 | K04 | K05 | K06 | K07 | K08 | K09 | K10 | K18 |
|---|---|---|---|---|---|---|---|---|---|---|---|---|
| TPV1 | 1 | 47.1 | 47.1 | 47.1 | 47.1 | 47.1 | 47.1 | 47.1 | 44.1 | 47.1 | 47.1 | 44.1 |
| F180A PP | 1 | 16.0 | 16.0 | 16.0 | 16.0 | 16.0 | 16.0 | 16.0 | 15.0 | 16.0 | 16.0 | 15.0 |
| HDPE 7960.13 | 1 | 25.0 | 15.0 | 12.0 | 15.0 | 15.0 | 12.0 | 9.0 | 14.0 | 20.0 | 17.5 | 14.0 |
| SiMB50-314 | 1 | 9.9 | 9.9 | 9.9 | 9.9 | 9.9 | 9.9 | 9.9 | 9.9 | 9.9 | 9.9 | 9.9 |
| Kenamide E Ultra | 11 | 2.0 | 2.0 | 2.0 | 2.0 | 2.0 | 2.0 | 2.0 | 2.0 | 2.0 | 2.0 | 2.0 |
| Mipelon XM-220 | 1 | — | 10.0 | 13.0 | 10.0 | 10.0 | 13.0 | 16.0 | 10.0 | — | — | 10.0 |
| PMX2000 Silicone Oil | 11 | — | — | — | — | — | — | — | 3.0 | 3.0 | 4.5 | 3.0 |
| Hi-Sil 233 | 1 | — | — | — | — | — | — | — | 2.0 | 2.0 | 3.0 | 2.0 |
| Total (wt %) | | 100% | 100% | 100% | 100% | 100% | 100% | 100% | 100% | 100% | 100% | 100% |
| Mixing Speed, Screw RPM | — | 300 | 300 | 250 | 300 | 300 | 300 | 300 | 300 | 350 | 350 | 350 |
| Melt Screen Mesh Size | — | 100 | 100 | 200 | 200 | 200 | 100 | 200 | 200 | 20 | 200 | 200 |

TABLE 8

Example 3 Formulations Continued

| | Barrel Section # | K11 | K12 | K13 | K14 | K15 | K16 | K17 | K19 |
|---|---|---|---|---|---|---|---|---|---|
| TPV1 | 1 | 47.1 | 47.1 | 47.1 | 47.1 | 47.1 | 47.1 | 47.1 | 44.1 |
| Braskem F180PP | 1 | 16.0 | 16.0 | 16.0 | 16.0 | 16.0 | 16.0 | 16.0 | 15.0 |
| HDPE 7960.13 | 1 | 25.0 | 15.0 | 12.0 | 15.0 | 12.0 | 21.9 | 18.0 | 14.0 |
| SiMB50-314 | 1 | 9.9 | 9.9 | 9.9 | 9.9 | 9.9 | 0.0 | 9.9 | 9.9 |
| PMX200 Silicone oil | 11 | 2.0 | 2.0 | 2.0 | 2.0 | 2.0 | 2.0 | 2.0 | 2.0 |
| Kemamide E Ultra | 6 | — | 10.0 | 13.0 | 10.0 | 13.0 | 13.0 | 7.0 | 10.0 |
| Mipelon XM-220 | 11 | — | — | — | — | — | — | — | 2.0 |
| Hi-Sil 233 | 1 | — | — | — | — | — | — | — | 3.0 |
| Total (wt %) | | 100% | 100% | 100% | 100% | 100% | 100% | 100% | 100% |
| Mixing Speed, Screw RPM | | 300 | 300 | 300 | 350 | 350 | 350 | 350 | 350 |
| Melt Screen Mesh Size | | 200 | 200 | 200 | 200 | 200 | 200 | 200 | 200 |

Injection molded plaques of the thermoplastic elastomer compositions in Tables 7 and 8 were made. The LCR viscosity, ESR, specific gravity, Shore D hardness, ultimate tensile strength, and ultimate elongation, and 100% Modulus of the plaques were measured with the results shown in Table 6.

Coextrusion laminate samples were made using samples of the formulations in Tables 7 and 8 as described with reference to Example 1. The roughness index, static COF, kinetic COF, bonding, and 90° bend of the coextrusion tape samples were tested. The tape samples were also visually inspected for a visual indication of the smoothness and the appearance of surface spots and blemishes with the results shown in Tables 9, 10, and 11.

TABLE 9

Example 3 Extrusion Tape Sample Properties

| Property | Units | K01 | K02 | K03 | K04 | K05 | K06 |
|---|---|---|---|---|---|---|---|
| LCR | Pa * s | 0.0022 | 0.0007 | 0.0026 | 0.0056 | 0.0011 | 0.0048 |
| ESR | Ra | 101.95 | 106.76 | 110.46 | 110 | 109.26 | 108.74 |
| SG | — | 51.7 | 81.9 | 71.2 | 69.6 | 70.6 | 71.2 |
| Shore D Hardness | — | 0.9492 | 0.9476 | 1.0004 | 0.9484 | 0.9496 | 0.9481 |
| M100 | MPa | 47.8 | 48.0 | 47.8 | 47.8 | 47.7 | 47.9 |
| UTS | MPa | 11.95 | NA | 11.95 | 12.05 | | |
| UE | % | 16.50 | 11.50 | 11.50 | 11.75 | 11.45 | 12.10 |
| Ri | | 580.0 | 55.0 | 125.0 | 105.0 | 95.0 | 40.0 |
| Static COF | | 2.3 | 4.1 | 4.4 | 4.2 | 4.4 | 4.6 |
| Kinetic COF | | 0.48 | 0.39 | 0.36 | 0.43 | 0.37 | 0.33 |
| Macro-agglomerates (visual) | — | Low | Low | None | None | Low | Low |
| Visual Aspect | — | smooth | OK roughness, no blemish | OK roughness, tiny blemish | OK roughness, no blemish | OK roughness, no blemish, finger marking (due to blooming of kemamide) | OK roughness, few blemish |
| Bonding Test (180° Bend) | | | | | | 1—Slight split 2—Slight split 3—Crack | |
| 90 °Bend | | | | | | No split. | |

TABLE 10

Example 3 Extrusion Tape Sample Properties Continued

| Property | Units | K07 | K08 | K09 | K10 | K18 | K11 |
|---|---|---|---|---|---|---|---|
| LCR | Pa * s | 0.0034 | 0.0142 | 0.003 | 0.0055 | 0.0538 | 0.0012 |
| ESR | Ra | 111.28 | 99.61 | 88.3 | 80.5 | 99.15 | 98.44 |
| SG | — | 79.1 | 112 | 62.7 | 64.0 | 116 | 52.8 |
| Shore D Hardness | — | 0.9486 | 0.961 | 0.9596 | 0.9657 | 0.9599 | 0.9499 |
| M100 | MPa | 47.8 | 46.6 | 46.2 | 45.1 | 46.5 | 47.4 |
| UTS | MPa | 12.15 | | 11.25 | 10.25 | | 11.85 |
| UE | % | 11.85 | 9.75 | 11.20 | 9.90 | 10.00 | 12.55 |
| Ri | | 120.0 | 80.0 | 375.0 | 202.0 | 82.0 | 470 |
| Static COF | | 4.6 | | | | | |
| Kinetic COF | | 0.34 | | | | | |
| Macro-agglomerates (visual) | — | Low | High | Low | Low | High | — |
| Visual Aspect | — | OK roughness, almost no blemish | high blemish level, not dispersed | smooth - no blemish | Blemishes, poor dispersion | undispersed | |
| Bonding Test (180° Bend) | — | | | 1—Half crack 2—half crack 3—crack | | | |
| 90 °Bend | — | | | No split. | | | |

TABLE 11

Example 3 Extrusion Tape Sample Properties Continued

| Property | Units | K12 | K13 | K14 | K15 | K16 | K17 | K19 |
|---|---|---|---|---|---|---|---|---|
| LCR | Pa * s | | 0.0009 | 0.0293 | 0.0068 | 0.0036 | | |
| ESR | Ra | 107.14 | 109.97 | 107.63 | 109.56 | 122.74 | 106.93 | 95.83 |
| SG | — | 86.2 | 78.1 | 134 | 93.2 | 84.4 | 98.1 | 107 |
| Shore D Hardness | — | 0.9493 | 0.9486 | 0.9488 | 0.9477 | 0.9473 | 0.9492 | 0.9600 |
| M100 | MPa | 47.7 | 48 | 48.1 | 48 | 51.7 | 47.9 | 46.8 |
| UTS | MPa | 10.65 | 12.3 | 12.74 | 11.75 | 13.55 | 12 | 11.15 |

TABLE 11-continued

Example 3 Extrusion Tape Sample Properties Continued

| Property | Units | K12 | K13 | K14 | K15 | K16 | K17 | K19 |
|---|---|---|---|---|---|---|---|---|
| UE | % | 11.4 | 12 | 13.36 | 11.65 | 10.95 | 10.4 | 10.45 |
| Ri |  | 40 | 110 | 57 | 70 | 135 | 265 | 150 |
| Static COF |  |  |  |  | 4.5 |  | 3.8 |  |
| Kinetic COF |  |  |  |  | 0.29 |  | 0.32 |  |
| Macro-agglomerate (visual) | — |  | Med | Low | None | Low | None | None | None |
| Visual Aspect | — | tiny blemish | blemish | Large blemish | blemishes but better aspect than K08 | Blemish, but better than K15 | few blemish but better than K16 and far better than K11 | blemishes but better than K18 |
| Bonding Test (180° Bend) | — |  |  |  |  |  |  | 1—crack 2—crack 3—Crack |
| 90 °Bend | — |  |  |  |  |  |  | No split. |

Example 4

In Example 4 thermoplastic elastomer compositions were made by mixing in a twin-screw extruder the formulations described in Table 12, where the formulation is shown weight percent by weight of the thermoplastic elastomer composition. The screw design used in Example 4 was the same as that used in Example 3. The twin-screw extruder had 15 barrel sections, and the barrel section at which each ingredient was introduced to the twin-screw extruder is shown in Table 12, along with the extruder screw mixing speed (in revolutions per minute, "RPM") used and the mesh size of the melt screen at the exit of the extruder. As the formulations exited the twin-screw extruder they were pelletized using an underwater pelletizer to form pelletized thermoplastic elastomer compositions.

TABLE 12

Example 4 Formulations

|  | Barrel Section # | D01 | D02 | D03 | D22 | D04 | D05 | D06 | D07 | D08 | D09 |
|---|---|---|---|---|---|---|---|---|---|---|---|
| TPV1 | 1 | 47.1 | 47.1 | 47.1 | 46.1 | 47.1 | 47.1 | 45.1 | 46.1 | 47.1 | 49.0 |
| F180A PP | 1 | 16.0 | 16.0 | 16.0 | 15.0 | 16.0 | 16. | 15.0 | 15.0 | 16.0 | 17.0 |
| HDPE 7960.13 | 1 | 25.0 | 15.0 | 12.0 | 12.0 | 15.0 | 12.0 | 11.5 | 12.0 | 9.0 | 13.0 |
| SiMB50-314 | 1 | 9.9 | 9.9 | 9.9 | 9.9 | 9.9 | 9.9 | 9.9 | 9.9 | 9.9 | 5.0 |
| Kenamide E Ultra | 11 | 2.0 | 2.0 | 2.0 | 2.0 | 2.0 | 2.0 | 2.0 | 2.0 | 2.0 | 2.0 |
| Mipelon XM-220 | 1 | — | 10.0 | 13.0 | 13.0 | — | — | — | — | — | — |
| Mipelon XM-330 | 1 | — | — | — | — | 10.0 | 13.0 | 13.0 | 13.0 | 16.0 | 14.0 |
| PMX2000 Silicone Oil | 11 | — | — | — | 1.0 | — | — | 2.0 | 1.0 | — | — |
| Hi-Sil 233 | 1 | — | — | — | 1.0 | — | — | 1.5 | 1.5 | — | — |
| Total (wt %) |  | 100% | 100% | 100% | 100% | 100% | 100% | 100% | 100% | 100% | 100% |
| Mixing Speed, Screw RPM | — | 350 | 350 | 350 | 350 | 350 | 350 | 350 | 350 | 350 | 350 |
| Melt Screen Mesh Size | — | 200 | 200 | 200 | 200 | 200 | 200 | 200 | 200 | 200 | 200 |

TABLE 13

Example 4 Formulations Continued

|  | Barrel Section # | D10 | D11 | D12 | D13 | D14 | D15 | D16 |
|---|---|---|---|---|---|---|---|---|
| TPV1 | 1 | 47.1 | 47.1 | 47.1 | 47.1 | 44.1 | 47.1 | 44.1 |
| F180A PP | 1 | 16.0 | 16.0 | 16.0 | 16.0 | 15.0 | 16.0 | 15.0 |
| HDPE 7960.13 | 1 | 15.0 | 12.0 | 9.0 | — | — | — | — |
| SiMB50-314 | 1 | 9.9 | 9.9 | 9.9 | 9.9 | 8.9 | 9.9 | 8.9 |
| Kenamide E Ultra | 11 | 2.0 | 2.0 | 2.0 | 2.0 | 2.0 | 2.0 | 2.0 |
| Ticona GUR 4150-3 | 1 | 10.0 | 13.0 | 16.0 | — | — | — | — |
| Mitsui Lubmer 5000 | 1 | — | — | — | 25.0 | 30.0 | — | — |
| Mitsui Lubmer 5220 | 1 | — | — | — | — | — | 25.0 | 30.0 |
| Total (wt %) |  | 100% | 100% | 100% | 100% | 100% | 100% | 100% |
| Mixing Speed, Screw RPM | — | 350 | 350 | 350 | 350 | 350 | 350 | 350 |
| Melt Screen Mesh Size | — | 200 | 200 | 200 | 200 | 200 | 200 | 200 |

TABLE 13

Surface Roughness of Example 4 Extrusion Tape Samples

| Property | D01 | D02 | D03 | D22 | D04 | D05 | D06 | D07 | D08 | D09 |
|---|---|---|---|---|---|---|---|---|---|---|
| Ra | 1.5 | 2.6 | 2.7 | 2.6 | 3.8 | 4.9 | 4.7 | 4.5 | 4.9 | 4.5 |
| Rm | 12.4 | 19.5 | 19.5 | 21.8 | 31.7 | 32.7 | 44 | 36.2 | 43.6 | 36.3 |
| Ri | 2.7 | 4.6 | 4.7 | 4.8 | 7.0 | 8.2 | 9.1 | 8.1 | 9.3 | 8.1 |

TABLE 13

Surface Roughness of Example 4 Extrusion Tape Samples Continued

| Property | D10 | D11 | D12 | D13 | D14 | D15 | D16 |
|---|---|---|---|---|---|---|---|
| Ra | 4 | 4.6 | 4.7 | 2 | 1.9 | 1.7 | 2.1 |
| Rm | 27.2 | 36.7 | 35.2 | 16 | 14.9 | 12.4 | 21.3 |
| Ri | 6.7 | 8.3 | 8.2 | 3.6 | 3.4 | 2.9 | 4.2 |

Example 5

In Example 5 thermoplastic elastomer compositions were made by mixing in a twin-screw extruder the formulations described in Table 13, where the formulation is shown weight percent by weight of the thermoplastic elastomer composition. The screw design used in Example 5 had more distributive/mixing elements than that used in Examples 3 and 4. The twin-screw extruder had 15 barrel sections, and the barrel section at which each ingredient was introduced to the twin-screw extruder is shown in Table 12, along with the extruder screw mixing speed (in revolutions per minute, "RPM") used and the mesh size of the melt screen at the exit of the extruder. As the formulations exited the twin-screw extruder they were pelletized using an underwater pelletizer to form pelletized thermoplastic elastomer compositions.

TABLE 13

Example 5 Formulations

| | Barrel Section # | D17 | D18 | D19 | D20 | D21 |
|---|---|---|---|---|---|---|
| TPV1 | 1 | 47.1 | 47.1 | 47.1 | 47.1 | 47.1 |
| Braskem F180A PP | 1 | 16.0 | 16.0 | 16.0 | 16.0 | 16.0 |
| HDPE 7960.13 | 1 | 15.0 | 15.0 | 15.0 | — | — |
| Dow Corning SiMB50-314 | 1 | 9.9 | 9.9 | 9.9 | 9.9 | 9.9 |
| Kenamide E Ultra | 7 | 2.0 | 2.0 | 2.0 | 2.0 | 2.0 |
| Mipelon XM-220 | 1 | 10.0 | — | — | — | — |
| Mipelon XM-330 | 1 | — | 10.0 | — | — | — |
| Ticona GUR 4150-3 | 1 | — | — | 10.0 | — | — |
| Mitsui Lubmer 5000 | 1 | — | — | — | 25.0 | — |
| Mitsui Lubmer 5220 | 1 | — | — | — | — | 25.0 |
| Total (wt %) | | 100% | 100% | 100% | 100% | 100% |
| Mixing Speed, Screw RPM | — | 350 | 350 | 350 | 350 | 350 |
| Melt Screen Mesh Size | — | 200 | 200 | 200 | 200 | 200 |

TABLE 13

Surface Roughness of Example 4 Extrusion Tape Samples Continued

| Property | D17 | D18 | D19 | D20 | D21 |
|---|---|---|---|---|---|
| Ra | 2.5 | 4.1 | 4.1 | 2 | 2.6 |
| Rm | 20.9 | 29 | 30.6 | 13.8 | 21.8 |
| Ri | 4.6 | 7.0 | 7.2 | 3.4 | 4.8 |

Figure 9A:
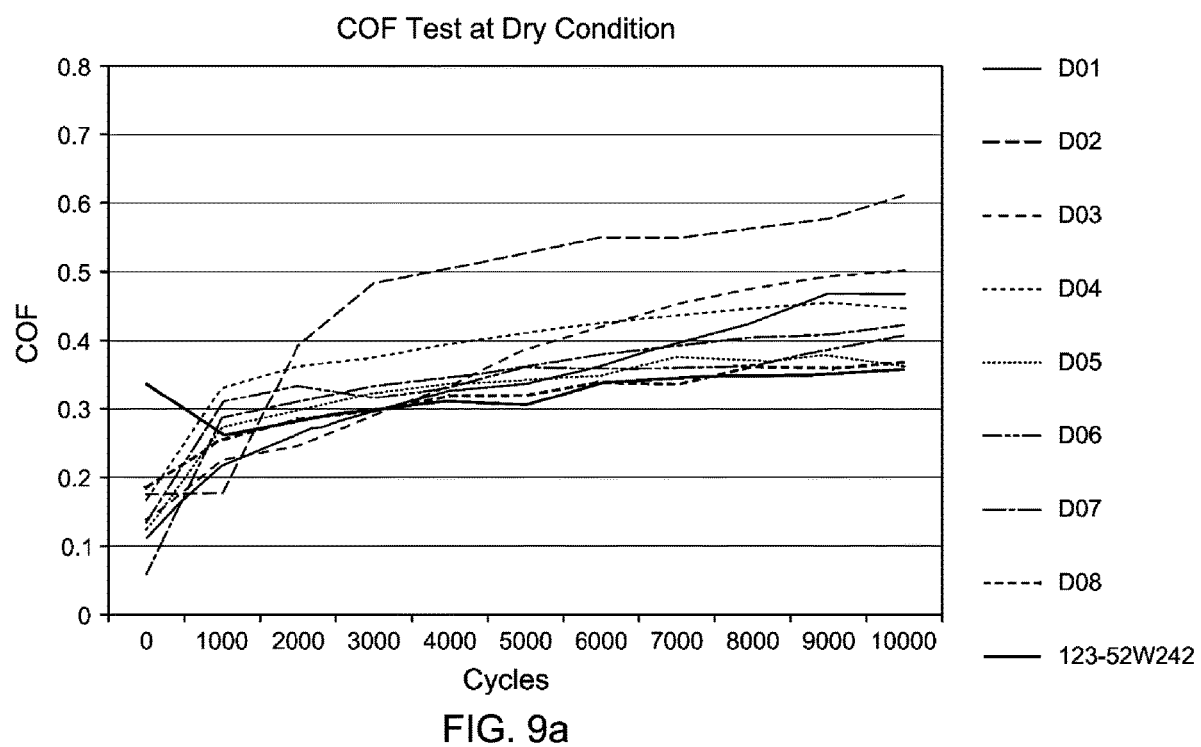
FIGS. 9a, 9b, and 9c show the coefficient of friction at dry conditions for samples of Examples 4 and 5.
Figure 9B:
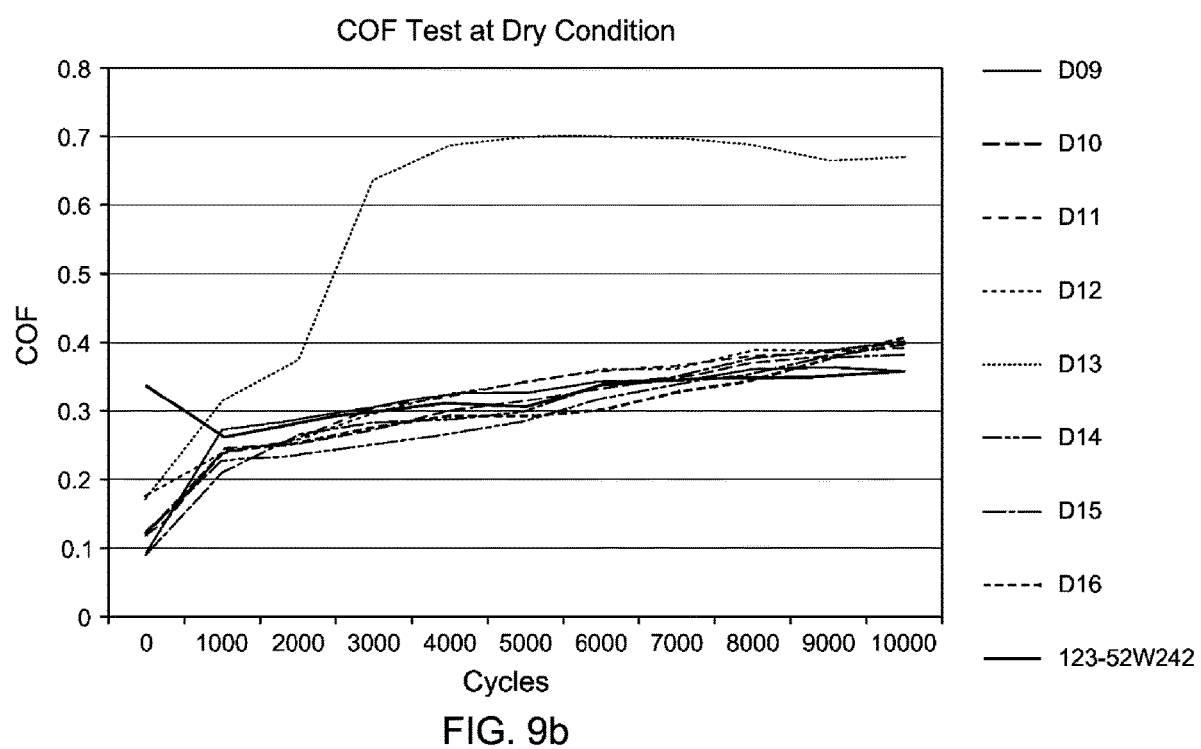
Figure 9C:
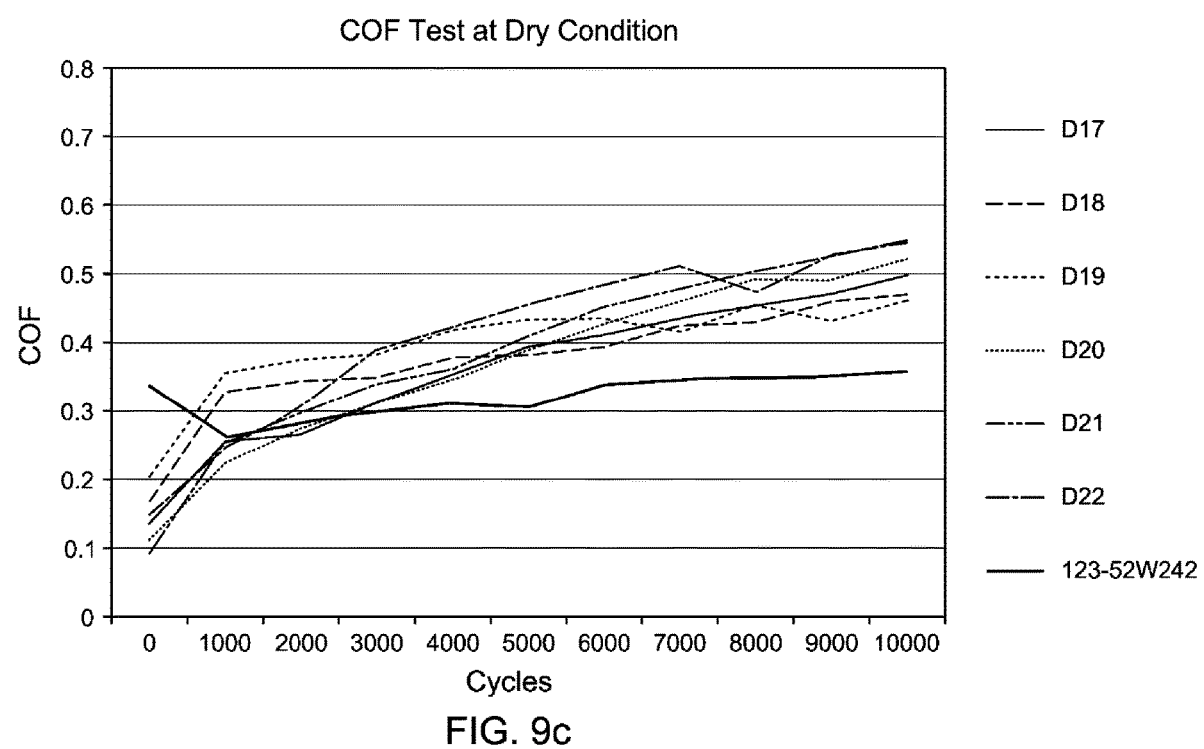

The coefficient of friction at dry conditions for the compositions of Example 4 and 5 were tested with reference to FIG. 2. The results are shown in FIGS. 9a, 9b, and 9c. Also shown in FIGS. 9a, 9b, and 9c are the coefficient of friction data for comparative thermoplastic vulcanizates Santoprene™ 123-52W242 available from ExxonMobil Chemical Company, which contain no HDPE or UHMWPE.

Figure 10:
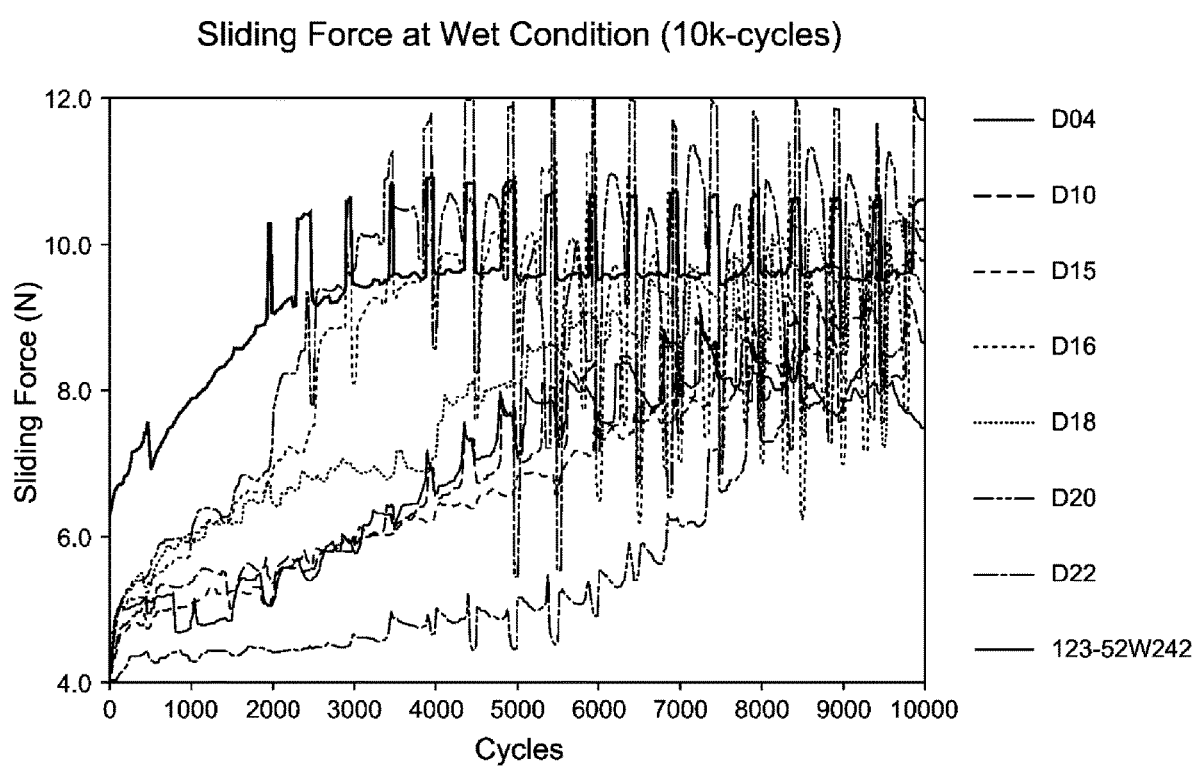
FIGS. 10, 11a, 11b, 12, 13, 14, and 15 show the sliding force at wet conditions for samples of Examples 4 and 5.
Figure 11A:
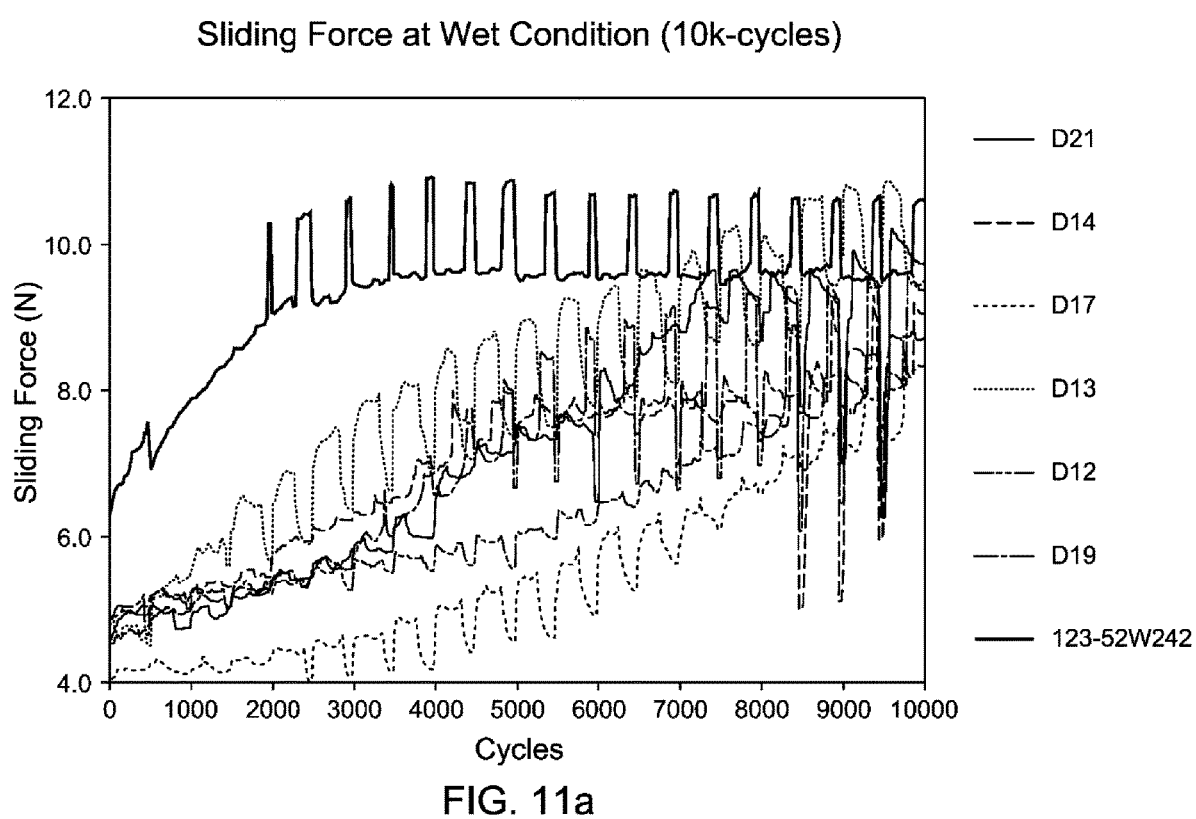
Figure 11B:
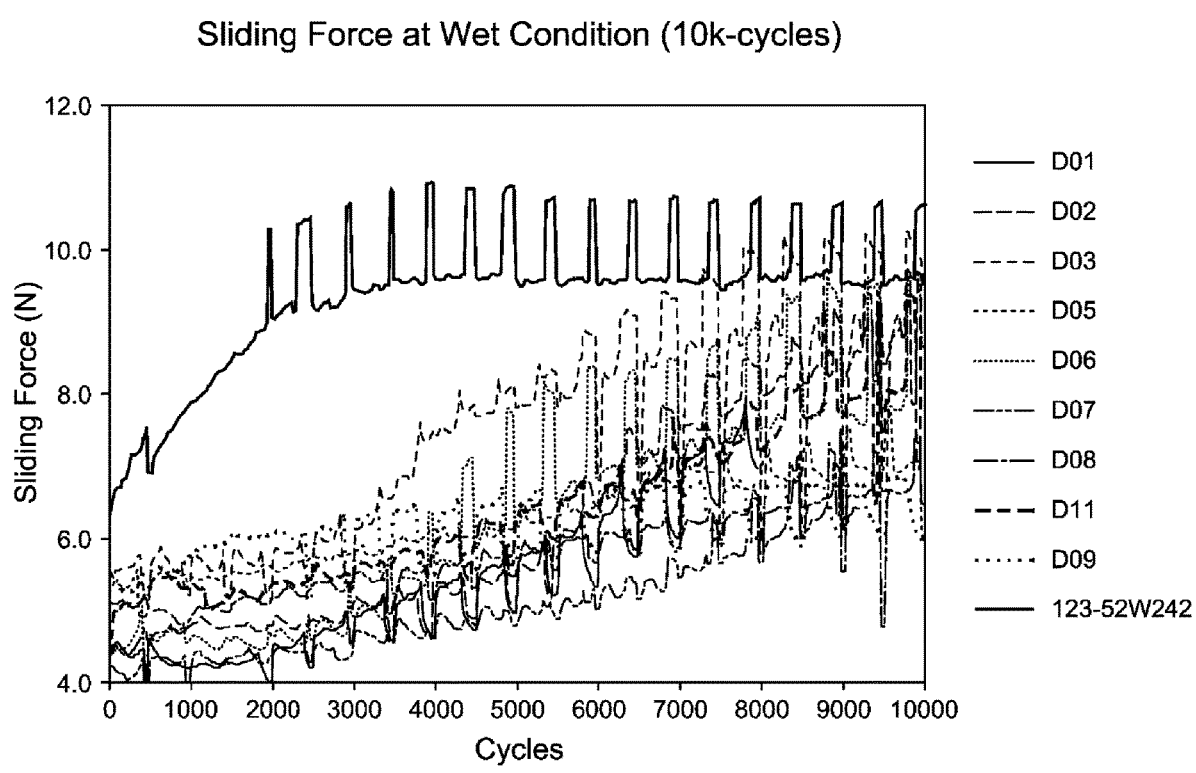
Figure 12:
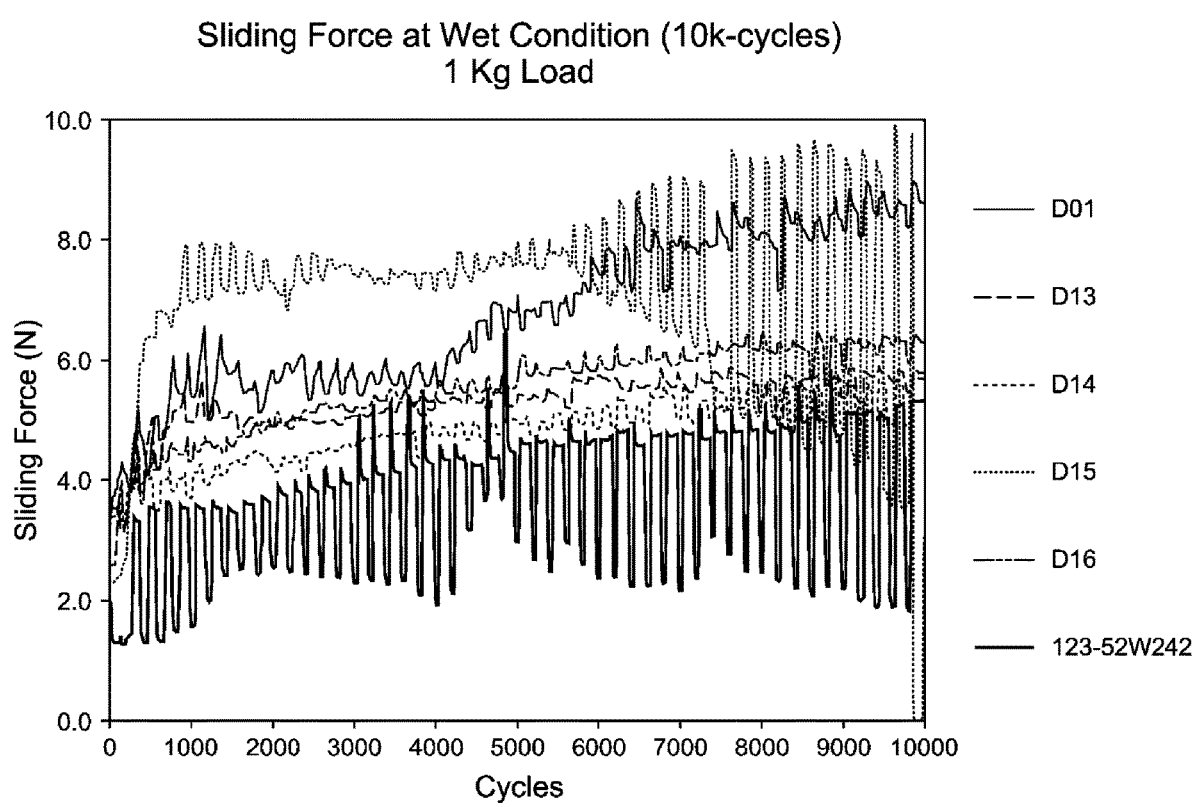
Figure 13:
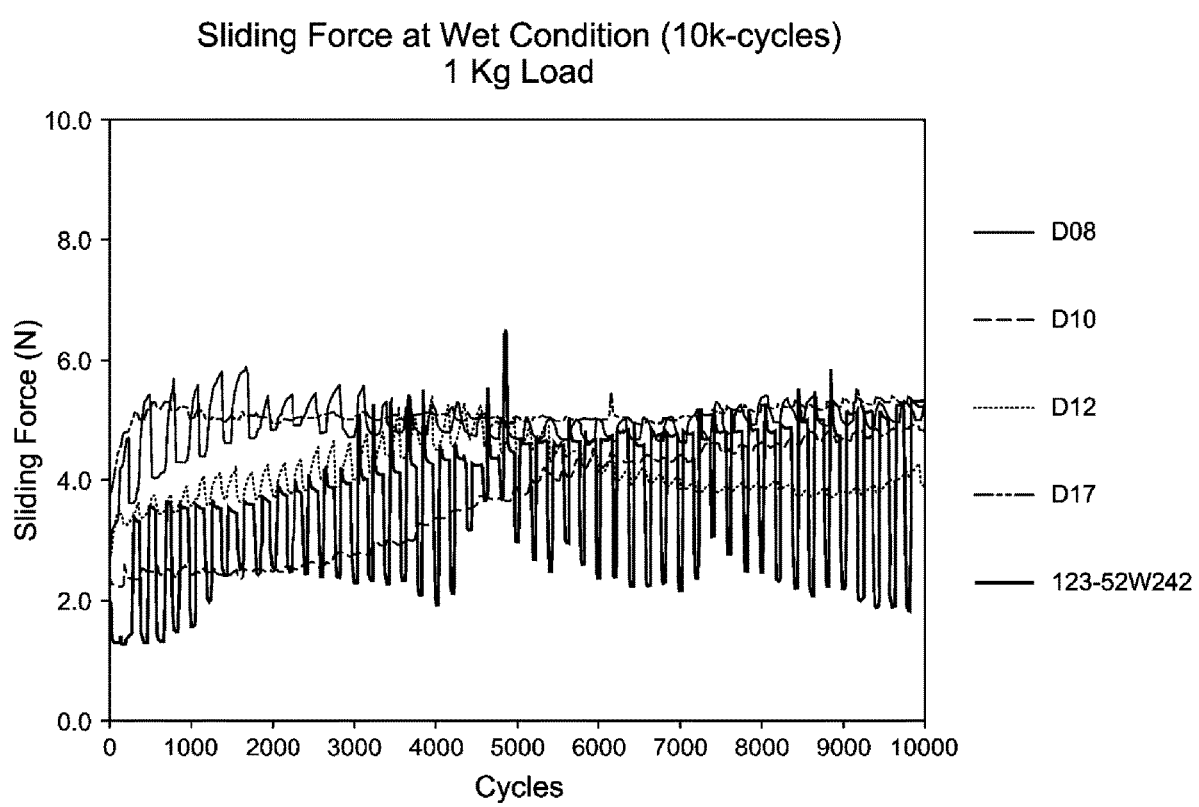
Figure 14:
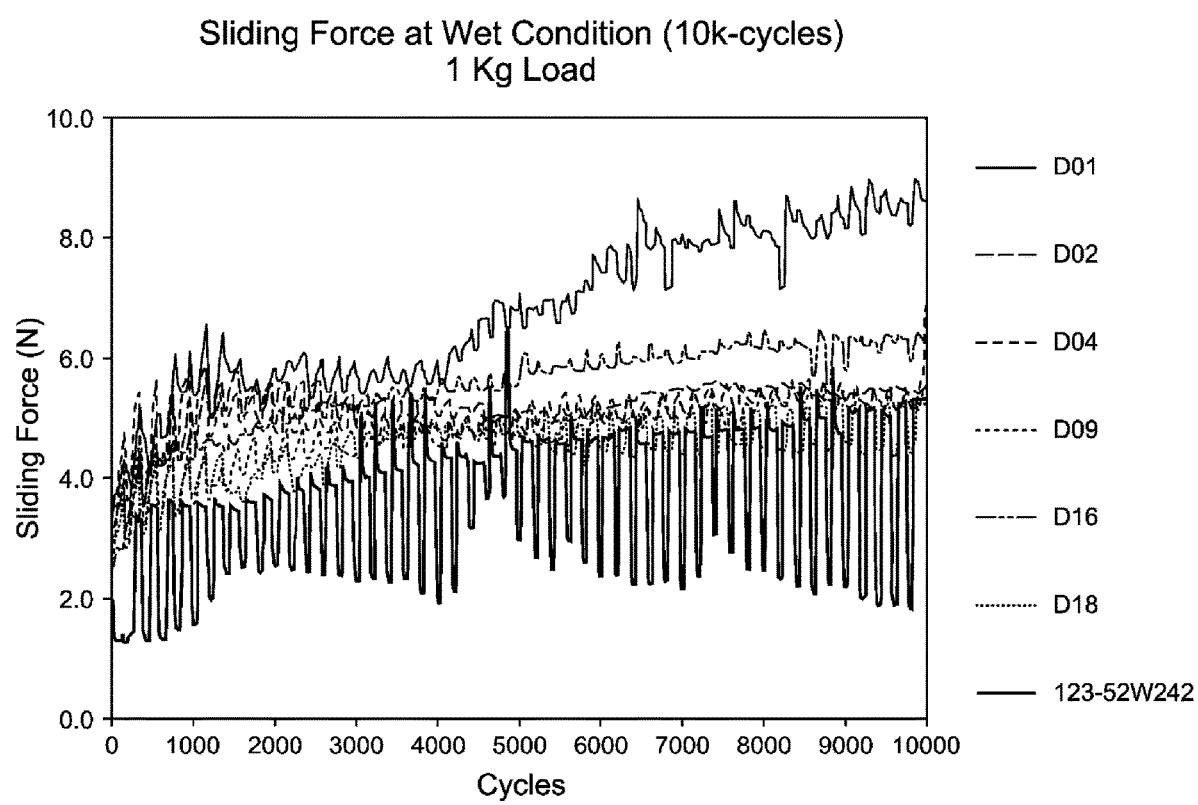
Figure 15:
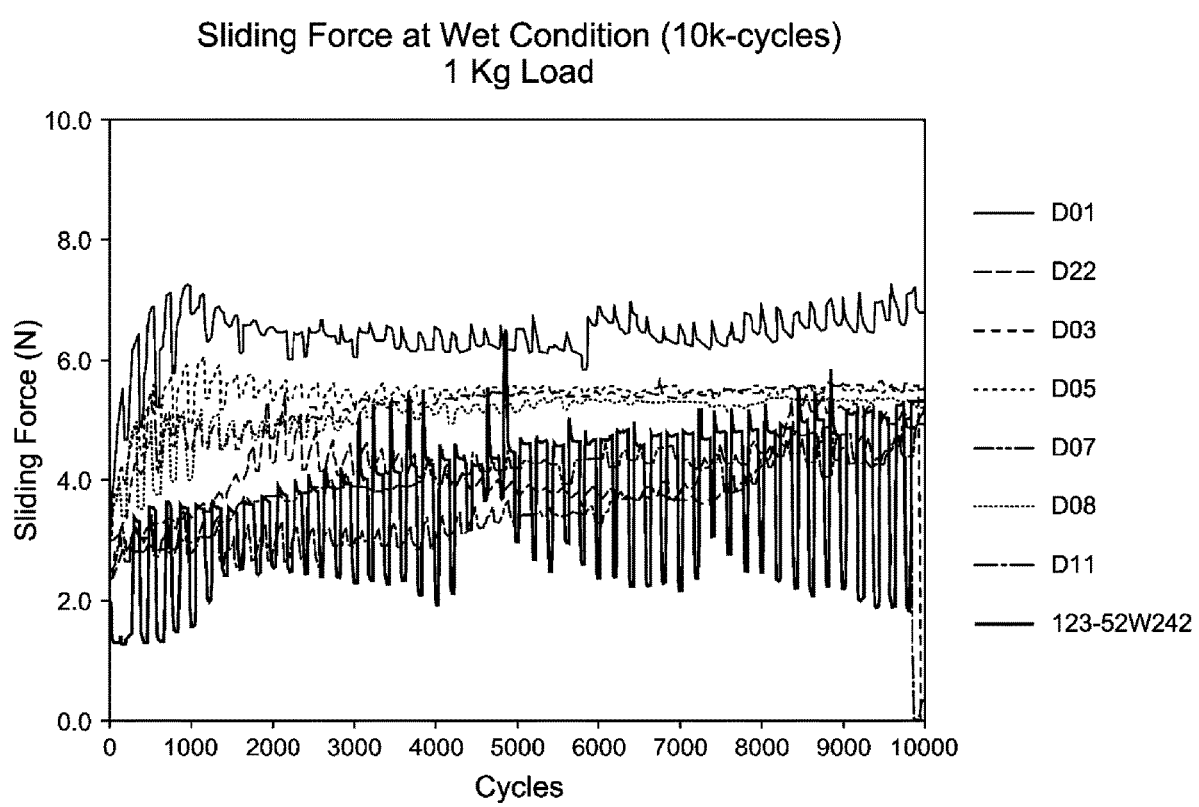
Figure 18A:
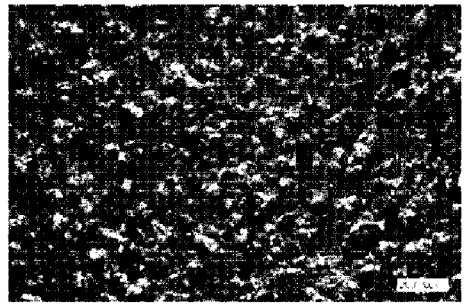
FIGS. 18a-18e are microscopy images of extrusion tapes made with samples D18, D19, D20, D21, and D22.
Figure 18B:
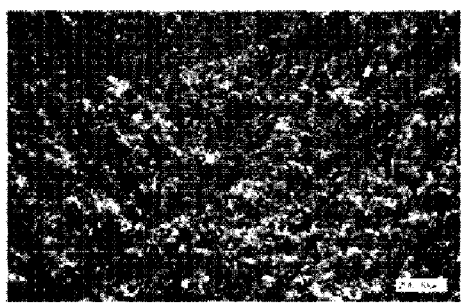
Figure 18C:
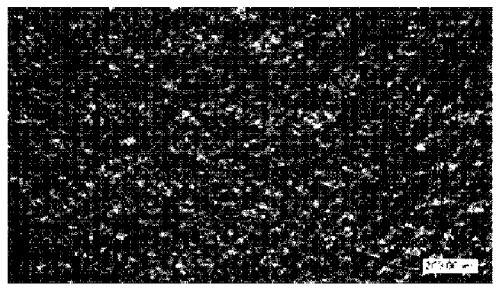
Figure 18D:
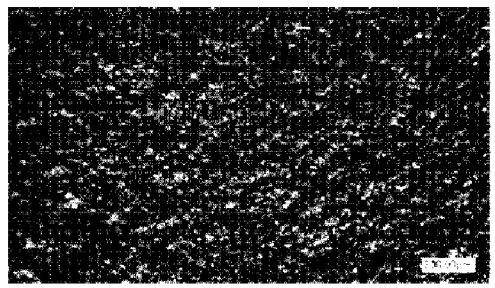
Figure 18E:
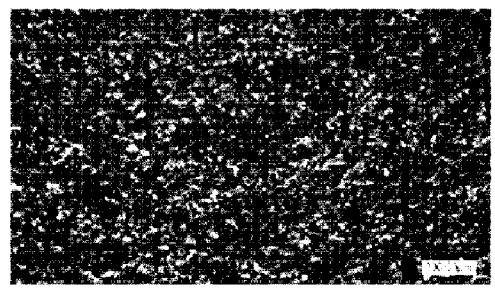

FIGS. 10, 11a, and 11b show the sliding force at wet conditions (10 k-cycles). As seen in these figures, several compositions (including D01, D02, D04-D12, D14, D15, D17, D18, and D22) exhibited generally lower sliding force over the 10,000 cycles than the comparative 123-52W242.

The sliding force of glass run channel profiles containing the thermoplastic elastomers as the slip coat was also measured with reference to FIG. 4. The results are shown in FIGS. 12, 13, 14, and 15.

FIGS. 16, 17, and 18 show microscopy images of the laminates.

For purposes of convenience, various specific test procedures are identified above for determining certain properties. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures can yield different results or measurements. Thus, a person of ordinary skill in the art is to expect experimental variations in measured properties that are reflected in the claims.

Certain embodiments and features have been described using a set of numerical upper limits and a set of numerical lower limits. It should be appreciated that ranges from any lower limit to any upper limit are contemplated unless otherwise indicated. All numerical values are "about" or "approximately" the indicated value, and take into account experimental error and variations that would be expected by a person having ordinary skill in the art.

As used herein, the phrases "substantially no," and "substantially free of" are intended to mean that the subject item is not intentionally used or added in any amount, but may be present in very small amounts existing as impurities resulting from environmental or process conditions.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. A thermoplastic elastomer composition comprising:
   (a) 30 to 60 wt %, based on the weight of the composition, of a thermoplastic vulcanizate, wherein the thermoplastic vulcanizate comprises a rubber phase that is dispersed and at least partially cross-linked within a continuous thermoplastic resin component;
   (b) 5 to 25 wt %, based on the weight of the composition, of thermoplastic resin;
   (c) 5 to 25 wt %, based on the weight of the composition, of a high density polyethylene having a density of greater than 0.93 g/cc, wherein the high density polyethylene has a melt index of less than 2 g/10 min at 190° C. and 2.16 kg; and
   (d) 5 to 40 wt %, based on the weight of the composition, of an ultrahigh molecular weight polyethylene, wherein the ultrahigh molecular weight polyethylene has an average particle size of less than 75 μm, and wherein the ultrahigh molecular weight polyethylene has a weight average molecular weight of greater than 1,500,000 g/mol;
   wherein the thermoplastic elastomer composition has a surface roughness of from 3 to 6 μm, wherein the thermoplastic elastomer composition has a kinetic coefficient of friction at dry conditions of less than 0.5 according to ASTM D1894-99 on glass, and wherein the thermoplastic elastomer composition is essentially free of silicone oil.

2. The thermoplastic elastomer composition of claim 1, wherein the composition comprises 40 to 50 wt % of the thermoplastic vulcanizate, based on the weight of the composition.

3. The thermoplastic elastomer composition of claim 1, wherein the thermoplastic vulcanizate comprises 20 to 60 wt % of continuous thermoplastic resin component, 10 to 40 wt % of rubber, and 15 to 50 wt % of oil.

4. The thermoplastic elastomer composition of claim 1, wherein the composition comprises 5 to 20 wt % of the high density polyethylene, based on the weight of the composition.

5. The thermoplastic elastomer composition of claim 1, wherein the high density polyethylene has a density greater than 0.94 g/cc.

6. The thermoplastic elastomer composition of claim 1, wherein the composition comprises 5 to 30 wt % of the ultrahigh molecular weight polyethylene, based on the weight of the composition.

7. The thermoplastic elastomer composition of claim 1, wherein the composition comprises 7 to 15 wt % of the ultrahigh molecular weight polyethylene, based on the weight of the composition.

8. The thermoplastic elastomer composition of claim 1, wherein the ultrahigh molecular weight polyethylene has an average particle size of from 20 to 75 μm.

9. The thermoplastic elastomer composition of claim 1, wherein the ultrahigh molecular weight polyethylene has an average particle size of from 20 to 40 μm.

10. The thermoplastic elastomer composition of claim 1, wherein the ultrahigh molecular weight polyethylene has a density greater than 0.91 g/cc.

11. The thermoplastic elastomer composition of claim 1, wherein the ultrahigh molecular weight polyethylene has a weight average molecular weight of greater than 1,750,000 g/mol.

12. The thermoplastic elastomer composition of claim 1, where the composition has an ultimate elongation of greater than 100%.

13. A laminate comprising:
    (a) a first layer comprising a thermoplastic vulcanizate; and
    (b) a second layer comprising the thermoplastic elastomer composition of claim 1.

14. The laminate of claim 13, wherein the laminate has an extrusion surface roughness of greater than 100 Ra.

* * * * *